(12) United States Patent
Hickman et al.

(10) Patent No.: US 10,391,633 B1
(45) Date of Patent: Aug. 27, 2019

(54) SYSTEMS AND METHODS FOR INVENTORYING OBJECTS

(71) Applicants: Ryan Hickman, Mountain View, CA (US); James J. Kuffner, Jr., Mountain View, CA (US); Anthony G. Francis, Jr., San Jose, CA (US); Chaitanya Gharpure, Sunnyvale, CA (US)

(72) Inventors: Ryan Hickman, Mountain View, CA (US); James J. Kuffner, Jr., Mountain View, CA (US); Anthony G. Francis, Jr., San Jose, CA (US); Chaitanya Gharpure, Sunnyvale, CA (US)

(73) Assignee: X Development LLC, Mountain View, CA (US)

(*) Notice: Subject to any disclaimer, the term of this patent is extended or adjusted under 35 U.S.C. 154(b) by 632 days.

(21) Appl. No.: 14/946,266

(22) Filed: Nov. 19, 2015

Related U.S. Application Data

(63) Continuation of application No. 13/463,596, filed on May 3, 2012, now Pat. No. 9,205,886.

(60) Provisional application No. 61/596,998, filed on Feb. 9, 2012, provisional application No. 61/483,291, filed on May 6, 2011.

(51) Int. Cl.
*B25J 9/16* (2006.01)

(52) U.S. Cl.
CPC .......... *B25J 9/1656* (2013.01); *B25J 9/1697* (2013.01)

(58) Field of Classification Search
None
See application file for complete search history.

(56) References Cited

U.S. PATENT DOCUMENTS

| | | | |
|---|---|---|---|
| 6,286,079 B1 | 9/2001 | Basham | |
| 6,600,418 B2 | 7/2003 | Francis | |
| 7,693,757 B2 * | 4/2010 | Zimmerman | G06Q 10/00 235/462.11 |
| 8,095,150 B2 | 1/2012 | Dunko | |
| 8,140,188 B2 * | 3/2012 | Takemitsu | B25J 9/1661 700/211 |
| 2003/0154141 A1 | 8/2003 | Capazario | |

(Continued)

FOREIGN PATENT DOCUMENTS

WO WO2008070208 * 6/2008 ............ G06F 19/00

*Primary Examiner* — Nathan C Uber
*Assistant Examiner* — Denisse Y Ortiz Roman
(74) *Attorney, Agent, or Firm* — McDonnell Boehnen Hulbert & Berghoff LLP

(57) ABSTRACT

The present application discloses systems and methods for inventorying objects. In one embodiment, a robot detects an object and sends identification data and location data associated with the detected object to a cloud computing system. The identification data may include an image of the object and/or information from a tag, code, or beacon associated with the object. In response to receiving the identification data and the location data, the cloud computing system identifies the object. The cloud computing system may also determine or create a first map associated with the identified object and a second map associated with the identified object. The first map may be associated with the current location of the object and the second map may correspond to a past location of the object. The cloud computing server may compare the first and second maps, and then send instructions to the robot based on the comparison.

16 Claims, 12 Drawing Sheets

(56) References Cited

U.S. PATENT DOCUMENTS

2010/0017407 A1  1/2010  Beniyama
2011/0288684 A1  11/2011 Farlow

* cited by examiner

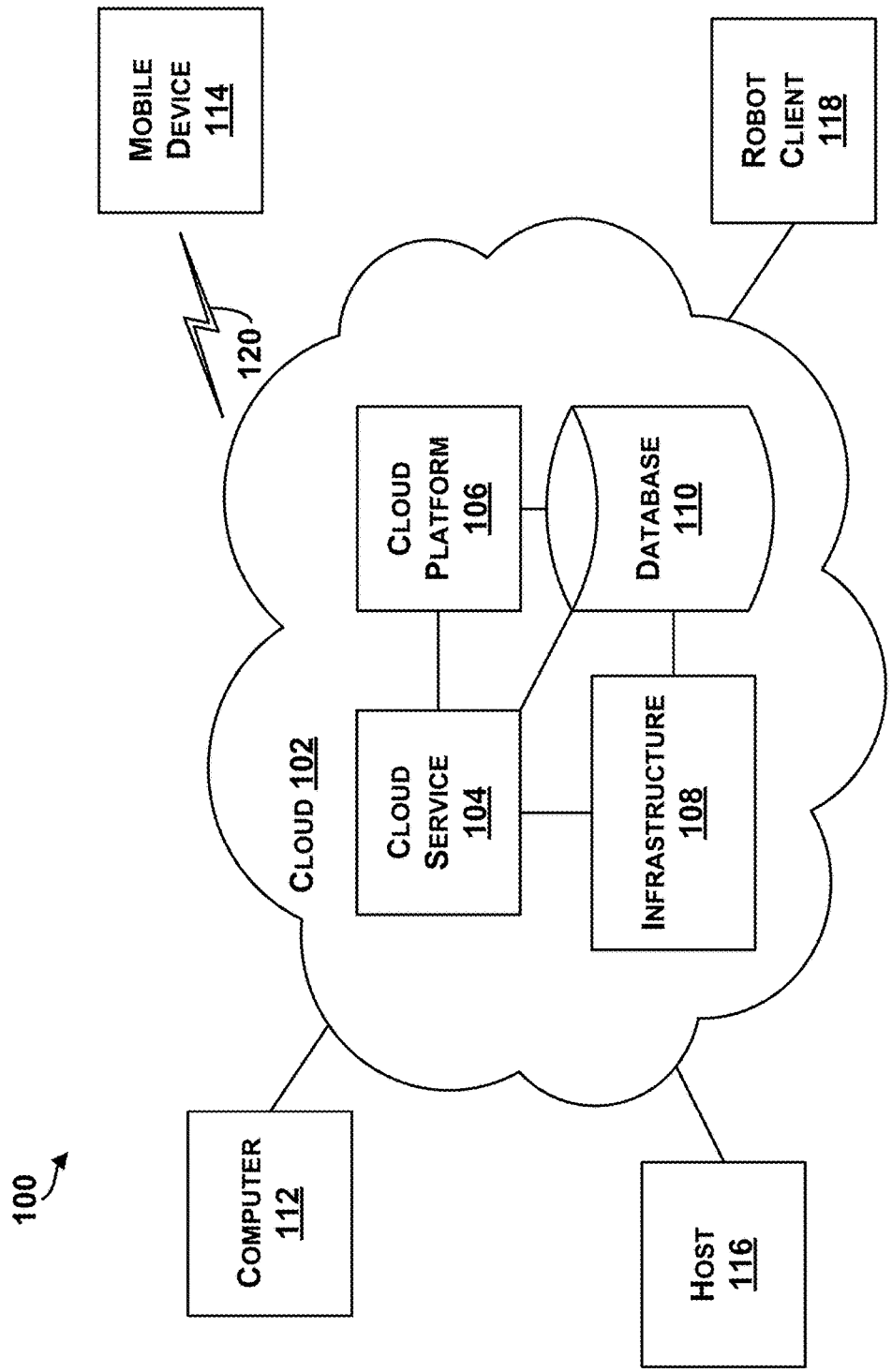

SYSTEMS AND METHODS FOR INVENTORYING OBJECTS

CROSS-REFERENCE TO RELATED APPLICATIONS

This patent application is a continuation of U.S. patent application Ser. No. 13/463,596, filed on May 3, 2012, the entire contents of which are hereby incorporated by reference, which claims priority to U.S. Application No. 61/483,291, filed on May 6, 2011, and to U.S. Application No. 61/596,998, filed Feb. 9, 2012, the contents of each of which are entirely incorporated herein by reference, as if fully set forth in this application.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service (or even an aggregation of existing cloud services) is "the cloud".

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing", data across multiple servers can be synchronized around the world allowing for collaborative work on one file or project, from multiple users around the world, for example.

SUMMARY

The present application discloses, inter alia, methods and systems for robot cloud computing.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, many types of devices may be used or configured to perform logical functions in any of the processes or methods described herein.

In yet further examples, many types of devices may be used or configured as means for performing functions of any of the methods described herein (or any portions of the methods described herein).

For example, a method may include a cloud computing system receiving, from a robotic device having at least one sensor, identification data corresponding to an object detected by the robotic device. The received identification data may be an image of the object, an identifier from an RFID tag or similar type of identifier tag associated with the object, and/or other identification data associated with the object (dimensions, texture, estimated weight, etc.). The method may further include the cloud computing system looking up the received identification data in a database system associated with the cloud computing system to identify the object corresponding to the identification data received from the robotic device. The cloud computing system may also receive, from the robotic device, a current location of the identified object. Based on the identification of the object, the cloud computing system may also identify (or alternatively generate) a first map in the database system, where the first map is associated with the current location of the identified object. The cloud computing system may also identify a second map in the database system, where the second map is associated with a past location of the identified object. The cloud computing system may also compare the first map and the second map to determine if the current location of the identified object in the first map is different than the past location of the identified object in the second map. The cloud computing system may then send instructions to the robotic device based on one or more differences between the first map and the second map.

In another example, a device may include a non-transitory computer-readable medium and program instructions stored on the non-transitory computer-readable medium and executable by at least one processor to perform a number of steps. The steps may include a cloud computing system receiving, from a robotic device, identification data corresponding to an object detected by the robotic device, and receiving, also from the robotic device, a current location of the object. The steps may also include the cloud computing system using the identification data to identify the object in a database system associated with the cloud computing system, and to also identify in the database system, a first map associated with the current location of the identified object and a second map associated with a past location of the identified object. The steps may further include the cloud computing system comparing the first map and the second map to determine if the current location of the identified object is different than the past location of the identified object. Instructions may be sent to the robotic device based on differences between the first map and the second map.

Another example may include a non-transitory computer-readable medium having stored thereon instructions executable by a computing device to cause the computing device to perform a number of functions. The functions may include receiving from a robotic device identification data associated with at least one object detected by the robotic device, identifying the at least one object, and receiving from the robotic device a current location of the identified at least one object. The functions may also using the identification data to further identify, via a database lookup, a first map associated with the current location of the identified at least one object and a second map associated with a past location of the identified at least one object. The functions may further include comparing the first map and the second map to determine if the current location of the identified at least one object is different than the past location of the identified at least one object. Instructions may be sent to the robotic device based on differences between the first map and the second map.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 1 is an example system for cloud-based computing;

DETAILED DESCRIPTION

Figure 2A:
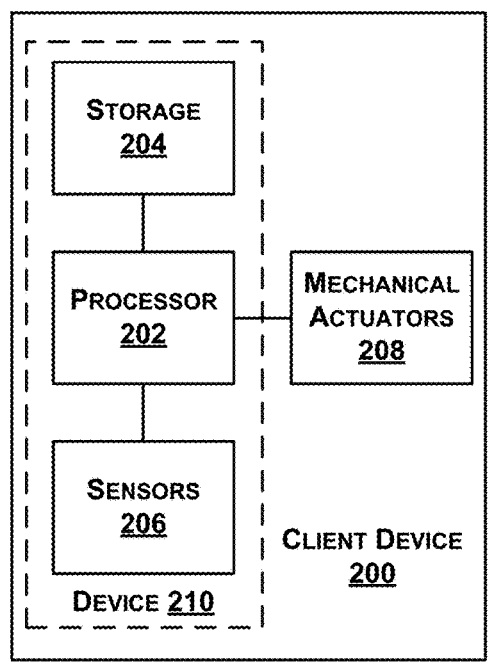
FIG. 2A illustrates an example client device.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may describe, inter alia, methods and systems for robot cloud computing. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from a robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with the cloud to facilitate object recognition, to perform a mapping function, or to perform navigational functions (i.e., receive a map/navigation pathway previously traversed by another robot). In other examples, a robot may interact with the cloud to perform mapping of objects in an area, to perform inventory of objects, and to perform voice recognition by and/or control of a robot. A robot may perform any actions or queries to the cloud as described herein based on contextual or situational information.

In some examples, rather than require a robot's knowledge base to be stored onboard the robot, some embodiments enable robots to store and access data at an external location, such as on a server and/or other computing device. The external location may receive data and/or or requests from one or more robots. A server may store received data from one or more robots and/or distribute all or part of the stored data to one or more robots so as to create a common knowledge base amongst the robots, where robots can obtain instructions and/or data.

In some embodiments, the robot or server may create or obtain a map of an area including a mapping of all objects in the area (locations and identifications of the objects). The robot may traverse through the same area at a later time to build the map representing the area at the later time. The robot or server may compare the two maps to determine and/or identify any differences. For example, a robot may perform a first mapping of a room to identify a base map (e.g., configuration of the room in a normal situation). The robot may perform subsequent mapping to identify new items placed in the room, such as a set of keys, to help a user find their keys. The base map may be the benchmark map of the room in a clean state, so that subsequent maps can be performed to determine a differential between the benchmark and a current condition of the room. The robot or server may compare a current inventory with the prior benchmark inventory.

In further embodiments, the robot or server may create an inventory of objects in an area, along with a mapping of the objects. The robot or server may catalog all objects in the space and store details of the objects (name, shape, color, last known location, etc.). The robot may follow a navigation path to inventory a space, so that the same navigation path can be traversed to identify missing and/or new objects. As another example, the robot may be an inventory robot configured to move about through a store to take inventory of what is in stock.

In yet further embodiments, all (or most) objects in an area may be tagged with a type of identifier (e.g., RFID, near field communication chip (NFC), Bluetooth transceiver, bar code). The robot may execute an application enabling the robot to identify the object based on the identifier. The robot may use the identifier to obtain information about the object including an identification of the object, details of the object (mass, color, type, brand, etc.), a location of the object, etc. The identifier may enable the localization and/or identification of the objects in the area. In some embodiments, some objects may emit beacons that can be received by a computing device, sensors, the robot, and/or the server. These beacons may contain an identifier similar to (or the same as) the identifier described above.

1. Cloud Computing Architecture

Referring now to the figures, FIG. 1 is an example system 100 for cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices, thereby taking advantage of the server devices' processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer, etc.), and the mobile device 114 may be any type of mobile computing device (e.g., laptop, mobile telephone, cellular telephone, etc.).

The host 116 may be any type of computing device with a transmitter/receiver including a laptop computer, a mobile telephone, etc., that is configured to transmit/receive data to/from the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, sonar, optical sensors, biosensors, Radio Frequency identification (RFID) systems, Near Field Communication (NFC) chip, wireless sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, and sensors 206) may all be custom designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot. Example sensors may include, smoke sensors, light sensors, radio sensors, infrared sensors, microphones, speakers, gyroscope, accelerometer, a camera, radar, capacitive sensors and touch sensors, etc.

The client device 200 may also have components or devices that allow the client device 200 to interact with its environment. For example, the client device 200 may have mechanical actuators 208, such as motors, wheels, movable arms, etc., that enable the client device 200 to move or interact with the environment.

In some example, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone, smartphone, tablet computer, etc. to function as the "brains" or control components of the robot. The device 210 may be considered a module of the robot. The device 210 may be physically attached to the robot. For example, a smartphone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a smartphone to download the routine from the cloud, and when the smartphone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the Internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone, smartphone, tablet computer, etc.), which can provide additional peripheral components to the device 200, such as any of an accelerometer, gyroscope, compass, GPS, camera, WiFi connection, a touch screen, etc., that are included within the device 210.

Figure 2B:
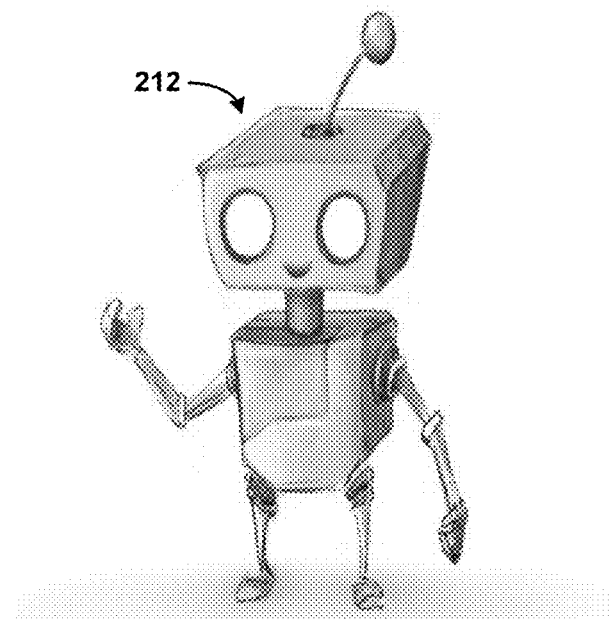
FIG. 2B illustrates a graphical example of a robot.

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

Figure 2C:
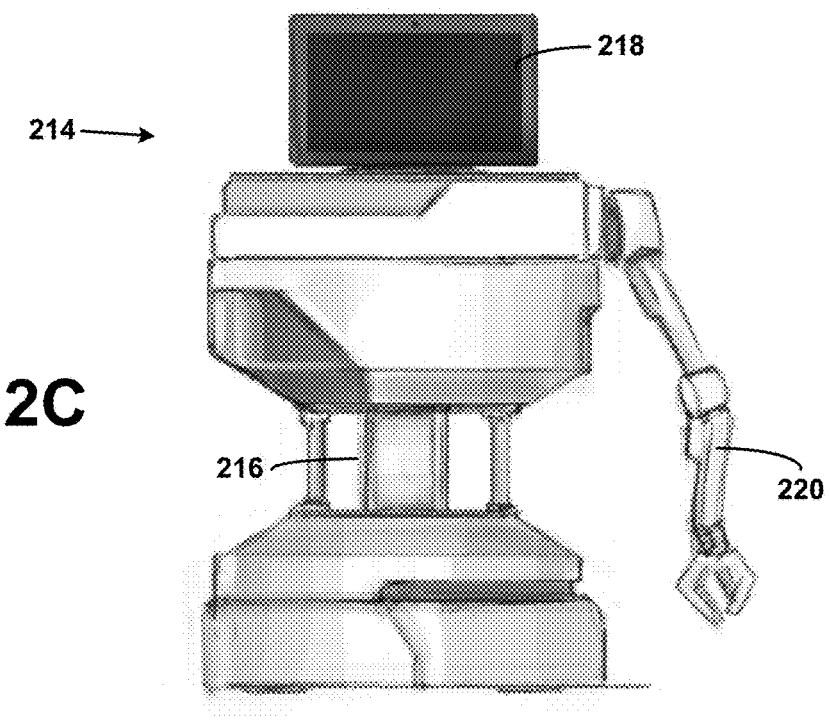
FIG. 2C illustrates another example of a robot.

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples may also include ROSJAVA. A robot operating system may include publish and subscribe functionality, and may also include functionality to control components of the robot, such as head tracking, base movement (e.g., velocity control, navigation framework), etc.

3. Robot and Cloud Interaction

Figure 3:
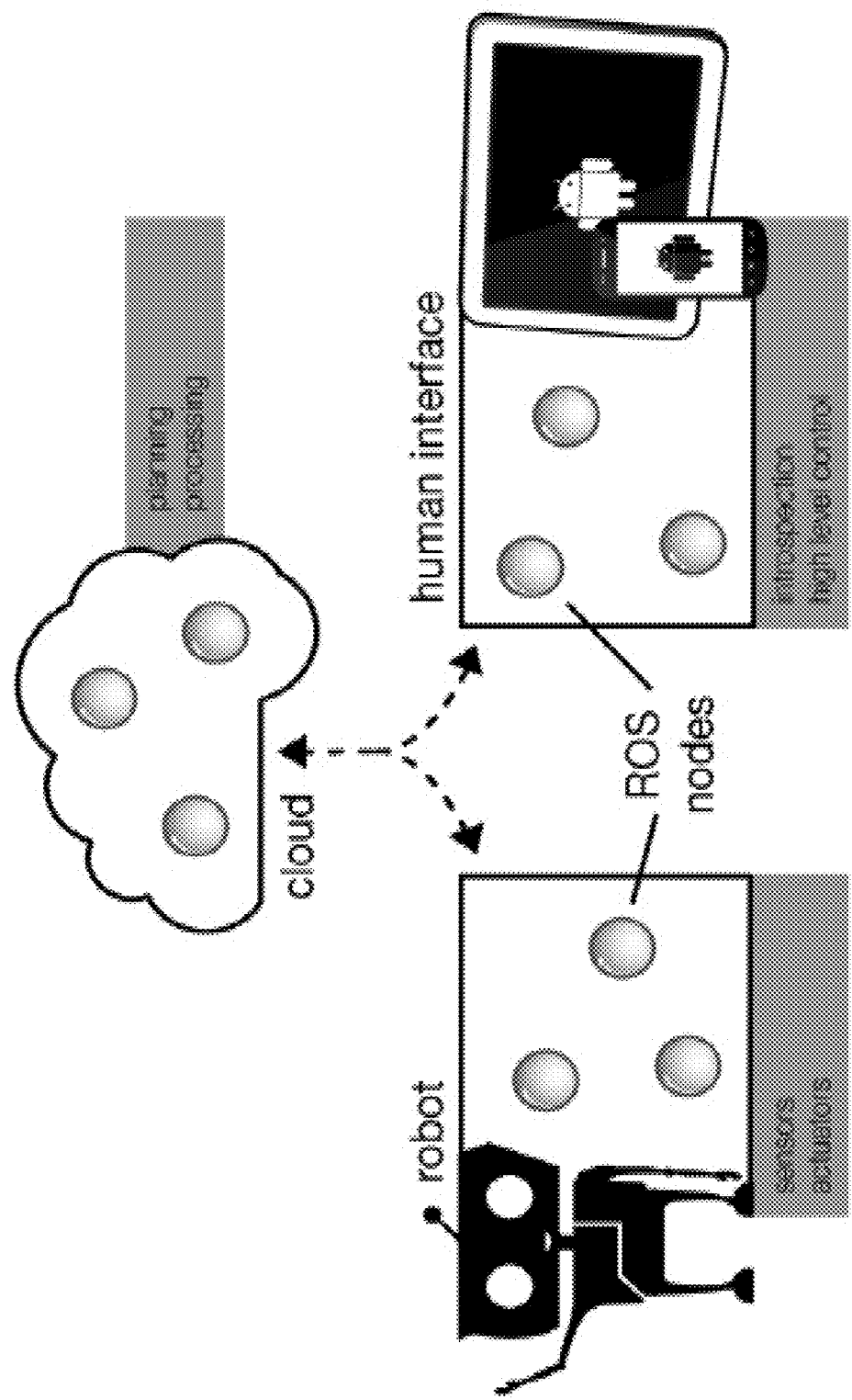
FIG. 3 illustrates an example of a conceptual robot-cloud interaction.

FIG. 3 illustrates an example of a conceptual robot-cloud interaction. A robot, such as a robot described and illustrated in FIG. 2, may connect to a network of computers (e.g., the cloud), and may request data or processing to be performed by the cloud. In one example, the robot may include a number of sensors and mechanical actuators that may generally provide motor control for the robot. Outputs of the sensors, such as camera feeds, vision sensors, etc., may be provided to the cloud, which can process the outputs to enable the robot to perform functions. The cloud may process a camera feed, for example, to determine a location of a robot, perform object recognition, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application, etc. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send data to a cloud for data processing, and in another example the robot may receive data from the cloud. The data received from the cloud may be in many different forms. The received data may be a processed form of data the robot sent to the cloud. The received data may also come from sources other than the robot. For example, the cloud may have access to other sensors, other robots, and the Internet.

Figure 4:
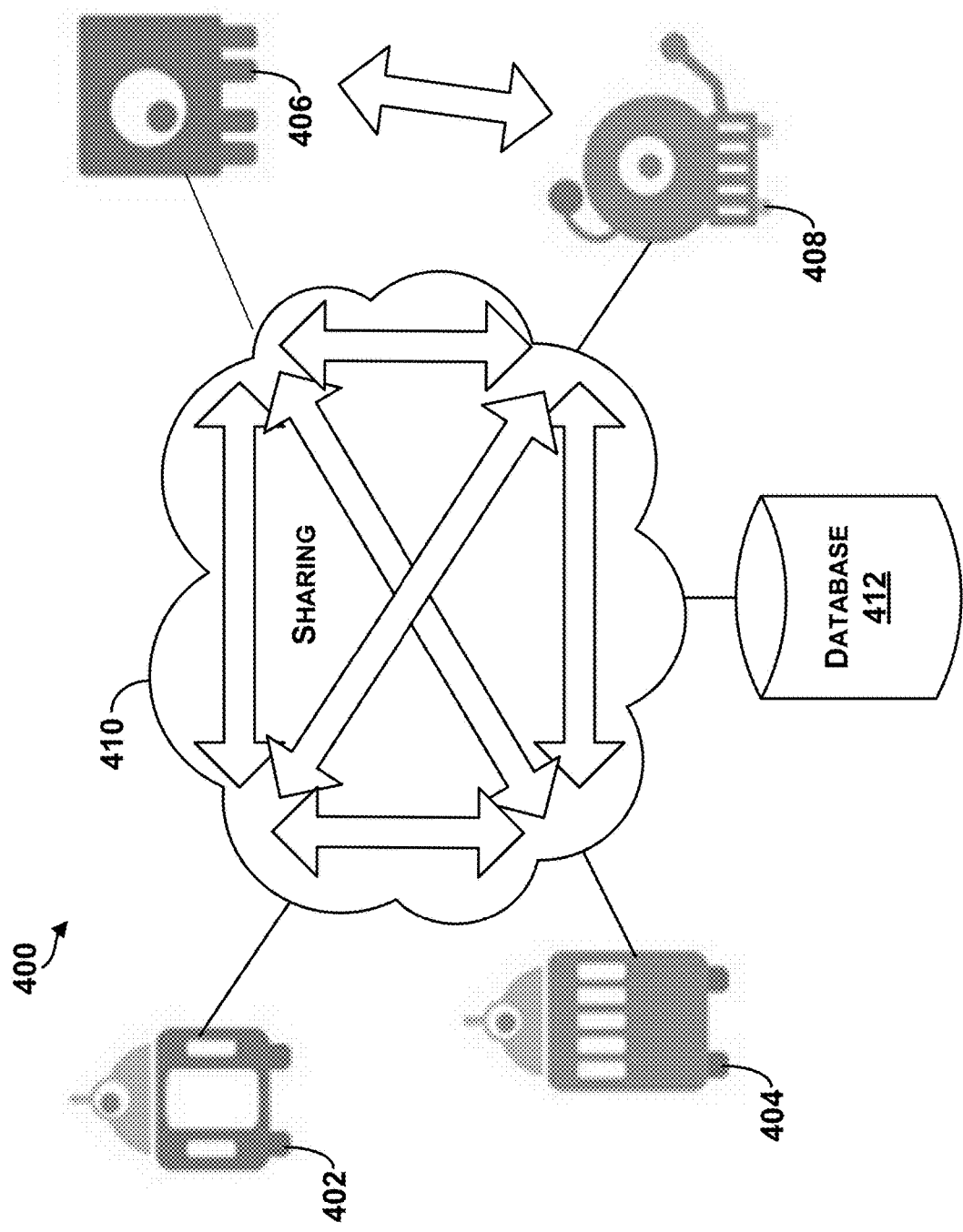
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be complied into a larger data set. For example, the robot 402 may take a picture of an object and upload the picture to the cloud 410. An object recognition program on the cloud 410 may be configured to identify the object in the picture and provide data about the recognized object to all the robots connected to the cloud 410, as well as possibly about other characteristics (e.g., metadata) of the recognized object, such as a location, size, weight, color, etc. Thus, every robot may be able to know attributes of an object in a photo uploaded by the robot 402.

The robots 402, 404, 406 and 408 may perform any number of actions within an area, with people, with other robots, etc. In one example, each robot 402, 404, 406 and 408 has WiFi or another network based connectivity and will upload/publish data to the cloud 410 that can then be shared with any other robot. In this manner, each robot 402, 404, 406 and 408 shares experiences with each other to enable learned behaviors. For example, the robot 402 may traverse a pathway and encounter an obstacle, and can inform the other robots 404, 406, and 408 (through the cloud 410) of a location of the obstacle. Each robot 402, 404, 406, and 408 will have access to real-time up to date data. In another example, the robot 404 can download data indicating images seen by the other robots 402, 406, and 408 to help the robot 404 identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, mapping of a physical location, such as providing data regarding a history of where a robot has been, can be provided. Another number or type of indicators may be recorded to facilitate mapping/navigational functionality of the robots 402, 404, 406, and 408 (e.g., a scuff mark on a wall can be one of many cues that a robot may record and then rely upon later to orient itself).

In one example, the cloud 410 may include, store, or provide access to a database 412 of information related to objects, and the database 412 may be accessible by all the robots 402, 404, 406, and 408. The database 412 may include information identifying objects, and details of the objects (e.g., mass, properties, shape, instructions for use, etc., any detail that may be associated with the object) that can be accessed by the robots 402, 404, 406, and 408 to perform object recognition. As an example, information regarding use of an object can include, e.g., for a phone, how to pick up a handset, how to answer the phone, location of buttons, how to dial, etc.

In addition, the database 412 may include information about objects that can be used to distinguish objects. For example, the database 412 may include general information regarding an object (e.g., such as a computer), and additionally, information regarding a specific computer (e.g., a model number, details or technical specifications of a specific model, etc.). Each object may include information in the database 412 including an object name, object details, object distinguishing characteristics, etc., or a tuple space for objects that can be accessed. Each object may further include information in the database in an ordered list, for example. In further examples, the database 412 may include a global unique identifier (GUID) for objects identified in the database 412 (e.g., to enable distinguishing between specific objects), and the GUID may be associated with any characteristics or information describing the object. Thus, a robot may be configured to access the database 412 to receive information generally distinguishing objects (e.g., a baseball vs. a computer), and to receive information that may distinguish between specific objects (e.g., two different computers).

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a map of an area, and then the robot can upload the data to the cloud 410 to share this knowledge with all other robots. In this example, a transportation of the given robot's "consciousness" can be made through the cloud 410 from one robot to another (e.g., robot "Bob" builds a map, and the knowledge of "Bob" can be downloaded onto another robot to receive knowledge of the map).

Thus, within examples, the robots 402, 404, 406, and 408 may share information through the cloud 410, and may access the database 412.

4. Robot and Cloud Functions

As mentioned, robots (or any client computing device) may interact with the cloud to perform any number of functions. Example functions are described below.

a. Object Recognition

Figure 5:
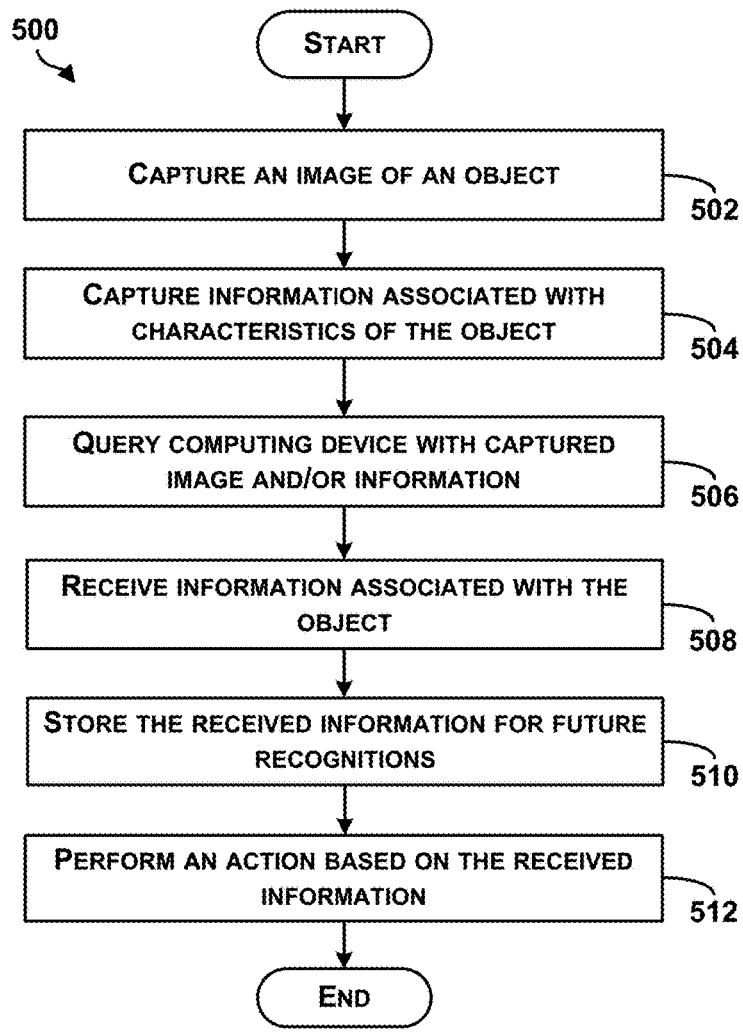
FIG. 5 is a block diagram of an example method of a robot interaction with the cloud to facilitate object recognition.

FIG. 5 is a block diagram of an example method of a robot interaction with the cloud to facilitate object recognition, in accordance with at least some embodiments described herein. Method 500 shown in FIG. 5 presents an embodiment of a method that, for example, could be used with the systems 100 and 400, for example, and may be performed by a device, such as another device illustrated in FIGS. 1-4, or components of the device. Method 500 may include one or more operations, functions, or actions as illustrated by one or more of blocks 502-512. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capturing an image of an object. In an example, a robot may capture many images of objects using any number of sensors, such as a camera (still pictures or video feeds), infrared sensors, etc.

At block 504, the method 500 includes capturing information associated with characteristics about the object. For example, a robot may optionally determine or record a weight, dimensions, a texture, color, or any type of physical attribute of the object.

As another example, in an instance in which the robot may communicate with the object, the robot may capture additional data of the object, such as by accessing memory of the object. For instance, if the object has communication capabilities (such as WiFi, Bluetooth, infrared or other wireless or wired methods), the robot may communicate with the object to determine any type of data. Additionally, the object may have serial/parallel ports through which the robot may communicate with the object.

At block 506, the method 500 includes querying a computing device with the captured image and/or information. As an example, the robot may query the cloud with a captured image by sending the captured image to the cloud and requesting information about the image, such as an identity of the image or information associated with characteristics of objects in the image. Alternatively, the robot may query another robot directly to request information about the object, such as an image of an alternate view of the object.

At block 508, the method 500 includes receiving information associated with the object. For example, the robot may receive data from the cloud indicating an identity of an object in the image, or other information related to or associated with characteristics about the object. In some examples, the cloud may perform object recognition on the uploaded image or video. For example, if a picture was taken in a living room, the cloud may be able to identify a television. The cloud may even be able to recognize an exact model of television, and provide information regarding instructions for use of the television.

At block 512, the method 500 includes storing the received information for future recognitions. For example, after receiving the information from the cloud, the robot would be able to recognize the object in the future enabling the robot to learn and adapt.

At block 512, the method 500 includes performing an action based on the received information. The action may vary based on a type of received information, or the query that is presented by the robot. As an example, a robot may capture an image of a coffee maker and provide the image to the cloud. In response, the robot may receive details about the coffee maker including an identity, model number, and instructions for use. The robot may then perform actions according to the instructions for use to use the coffee maker. As another example, a robot may open a refrigerator, take inventory of objects inside (e.g., capture images, identify objects), determine/receive recipes for possible meals based on the determined inventory, and suggest a meal based on items in the refrigerator.

As an example, the robot may query the cloud to identify an object and details of the object to enable the robot to interact with the object. If the received information is not fully accurate (e.g., the robot determines a different weight of the object), the robot can share this information with the cloud to update/modify a shared database in the cloud.

As an additional or alternative method for performing object recognition, objects may be tagged with a type of identifier (e.g., radio frequency identification (RFID) chip, near field communication chip (NFC), bar code, etc.), so that a robot may include an application enabling the robot to identify the object based on the identifier. The identifier may provide information about the object including an identification, details of the object (mass, color, type, brand, etc.), a location of the object, etc. In some examples, objects may emit beacons that can be received by the robots to determine existence/identification/location of the object. In this example, a physical environment may be instrumented with beacons in forms of NFC, RFID, QR codes, etc. to enable a robot to localize and identify objects. Beacons may be stationary beacons or moving beacons (e.g., RFID in an employee's ID badge) to perform tracking of objects.

Figure 6:
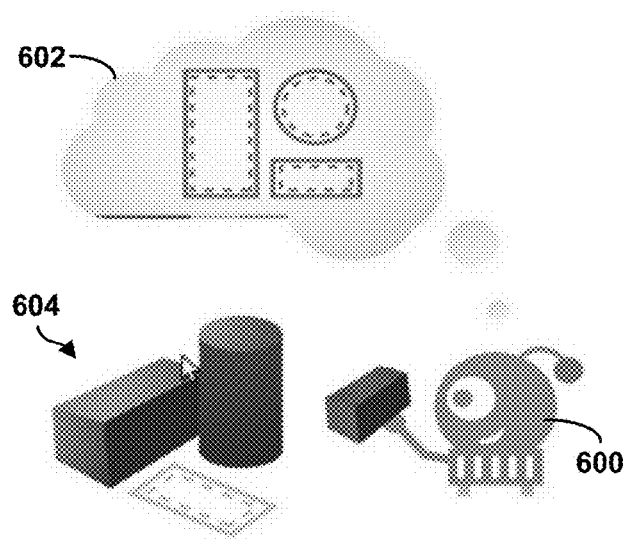
FIG. 6 is an example conceptual illustration of a robot interacting with a cloud to perform object recognition and interaction.

FIG. 6 is an example conceptual illustration of a robot 600 interacting with a cloud 602 to perform object recognition and interaction, or other functions as described in FIG. 5. The robot 600 may interact with an object (such as any of objects 604), and interact with the cloud 602 as described above to further interact with the object.

In some examples, the method 500 to facilitate object recognition may be a higher-level service (e.g., higher in a software stack), such that details and specifics for how to recognize an object may be performed by the cloud. The robot may be configured to perform actions/functions based on a result of object recognition, rather than or in addition to, performing functions regarding recognizing an object. As an example, using the method 500, the robot may execute software to perform function calls, such as GetObject( ) which may return information associated with an object (e.g., a cereal box), or PickUpObject( ) which may cause the robot to pick up the object. Enabling function calls and operation of robots through the cloud facilitates control and operation of the robot without having to control or operate various sensors/mechanical aspects of the robot, for example.

b. Mapping Functions

Figure 7:
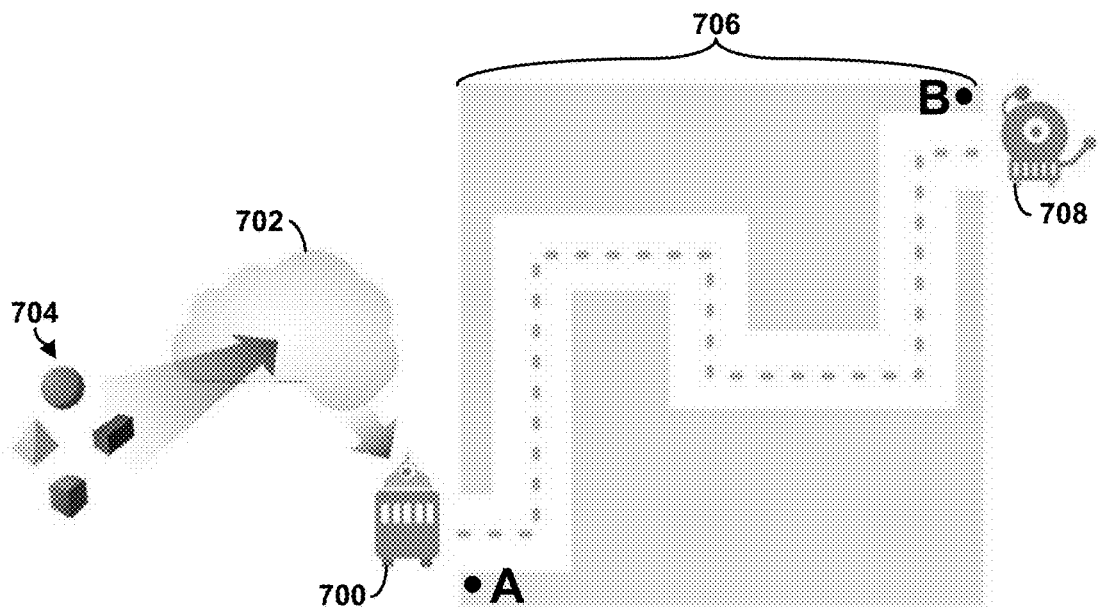
FIG. 7 is an example conceptual illustration of a mapping function.

FIG. 7 is an example conceptual illustration of a mapping function. A robot 700 may interact with a cloud 702 to perform functions as described in FIG. 5, for example, such as to perform object recognition queries of objects 704. The robot 700 may traverse through an area 706 in any number of pathways so as to map the area. As an example, the robot 700 may be configured to roam around an area in which the robot 700 is located to create a map of the area 706 (e.g., room of a house) with the aid of cloud processing. As the robot 700 navigates through the area 706 using any number of sensors to determine nearness to objects or capture images of objects, the robot 700 may relay data collected from various sensors to the cloud 702. The robot 700 may use sensors to return still pictures, video, location data, and distance information to the cloud computing system.

To perform mapping functions, the robot 700 may traverse through the area 706 capturing images using a range camera, video camera, etc., and send the data to the cloud 702. The robot 700 (or servers in the cloud 702) may identify objects within the data and provide annotations (such as mass, shape, material, etc.) of the objects. A computerized map may be generated to represent the area 706, and computer graphics (e.g., low resolution graphics) can be used to represent identified objects.

As another robot and cloud function, computer graphics within the generated map of the area 706 may be replaced with high resolution images of the objects. For example, the robot 700 may capture an image of a couch, and the cloud 702 may identify a specific model of the couch, and perform a search within a database to locate/identify a retailer that manufactures/sells the couch. A server in the cloud 702 may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Figure 8:
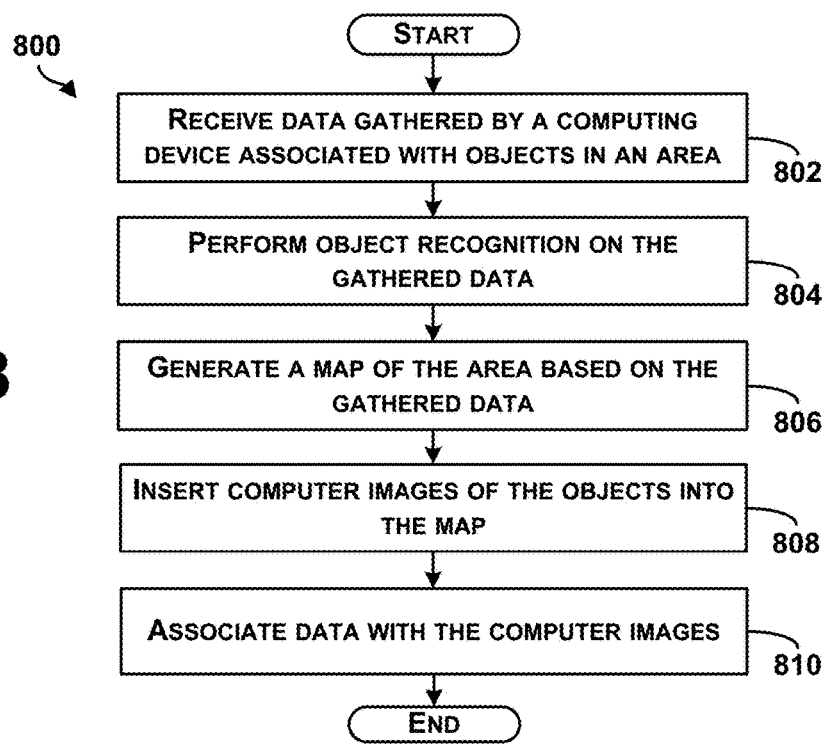
FIG. 8 is a block diagram of an example method for mapping of objects in an area or mapping an area.

FIG. 8 is a block diagram of an example method for mapping of objects in an area or mapping an area, in accordance with at least some embodiments described herein. Method 800 shown in FIG. 8 presents an embodiment of a method that, for example, could be used with the systems 100 and 400, for example, and may be performed by a device, such as the devices illustrated in FIGS. 1-4, or components of the device. The various blocks of method 800 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive, or any other type of non-transitory media described elsewhere herein.

At block 802, the method 800 includes receiving data gathered by a computing device associated with objects in an area. For example, a robot may traverse an area and capture raw data (e.g., such as point map data) and images (e.g., still or video feed) using a range camera, video camera, still camera, etc. The robot may provide the gathered data to the cloud, which may receive the gathered data. Additionally, the cloud may receive gathered metadata associated with the objects in the area, such as a time the data was collected, a location (e.g., GPS location) at which the data was collected, or other characteristics regarding when/how the data was collected.

At block 804, the method 800 includes performing object recognition on the gathered data. A server on the cloud may interpret objects, and further, shapes can be matched with a three-dimensional warehouse or database of objects to identify representations of the point maps. The server may use any type of object recognition methods, such as by matching edges, colors, variances, etc., of the gathered data to known objects within a database. The objects within the database may have associated metadata indicating characteristics of the objects.

Thus, the server can perform object extraction to identify and extract objects from the received data. The server can further localize the objects precisely in a map and provide annotations for the objects. Example annotations include mass, shape, material, etc. of the object. Annotated objects may be stored and shared through a global object database, such as, the database 412 in FIG. 4.

At block 806, the method 800 includes generating a map of the area based on the gathered data. For example, the server may use locations of the data collected as well as times the data was collected to interpret a path traversed by the robot and to create a conceptual map. The map may be further generated based on circumstantial data of the recognized objects, such as size and shape of the object. If an object has a known size and shape, and the location of the object is known, an estimated area at which the object is present can be determined.

At block 808, the method 800 includes inserting computer images of the objects into the map. For example, the server may retrieve a computer image of the recognized object (e.g., television), and insert the object into the location on the generated map at which the object is present.

At block 810, the method 800 includes associating data with the computer images. For example, the server may associate any number of metadata with the computer image, or may alternatively, retrieve metadata or other high resolution images representing the object from a retailer's database for insertion into the computer generated map. As described above, an image of a couch may be captured, and the server may identify a specific model of the couch, and perform a search within a database to locate/identify a retailer that manufactures/sells the couch. A server in the cloud may query a retailer's server to receive a high resolution image of the couch that may also include other metadata indicating characteristics of the couch (e.g., style, material, price, availability, etc.). The high resolution image of the identified couch may be inserted into the computer generated map to replace the computer graphics representing the couch. Thus, an annotated mapping of objects in an area can be generated.

Thus, in some examples, a robot builds shapes and appearances of all objects in a scene and performs object recognition as possible (with the help of the cloud) to provide an annotated map of objects. Raw data is gathered (e.g., point map) and used with camera data (e.g., indicating color/texture of objects) to interpret objects, and further, shapes can be matched with a 3D warehouse of objects to identify representations of the point clouds.

Figure 9A:
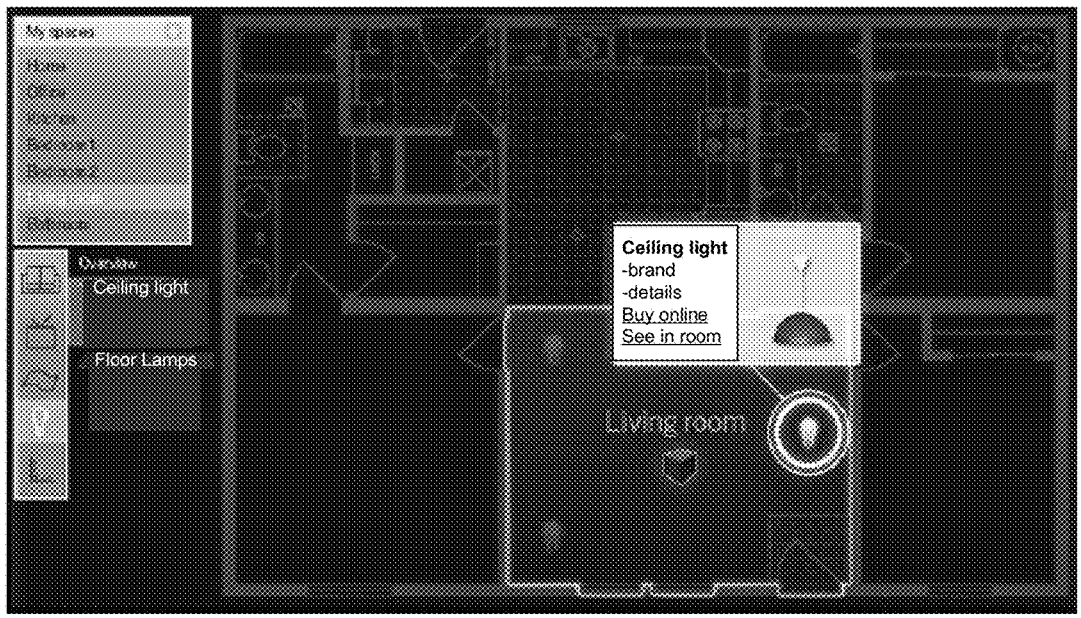
FIGS. 9A-9B are example interfaces illustrating a map of an area, and objects in the map.
Figure 9B:

FIGS. 9A-9B are example interfaces illustrating a map of an area, and objects in the map. For example, in FIG. 9A, a home has been outlined (e.g., in a blueprint format) to show different rooms in the home. Items in the home may also have been mapped. FIG. 9B illustrates an example interface illustrating mapping of objects in a room. In some examples, the interfaces in FIGS. 9A-9B, and methods described herein, may enable a user to determine configurations of rooms, and objects in the rooms. As one example, a user may be in a store and identify a few television stands that the user would like to purchase; however, the user would like to see how the television stands look/fit into the room configuration. The user may capture some images of the television stands using a device, cause the device to perform object recognition (e.g., using the method 500 in FIG. 5), access the interface in FIG. 9A to select a room in which to place the television stand, and access the interface in FIG. 9B to insert the new television stand in place of an old television stand (e.g., swap out the old television stand with the new television stand and place the television and peripherals into a desired configuration). The example interfaces in FIGS. 9A-9B may be used to maneuver computer generated objects in a room, for example.

In further examples, the interfaces in FIGS. 9A-9B may provide information (e.g., metadata) regarding rooms or objects in the rooms as determined during a mapping of the room. For example, the interface in FIG. 9A may indicate details regarding a ceiling light, such as a brand name, a model number, details regarding light bulbs used by the ceiling light, etc., and the metadata may provide links to purchase the ceiling light or accessories online, or a link to see the ceiling light in the room, such as a link to the example interface in FIG. 9B.

c. Navigation Functions

Referring back to FIG. 7, in one example, the robot 700 may receive instructions to navigate from point A to point B across the area 706. The robot 708 may have completed this navigation previously, and may have uploaded information regarding a possible navigation pathway to the cloud. The robot 708 may have documented objects along the pathway, and also, possible obstructions as well. The robot 700 may query the cloud requesting navigation instructions to traverse from point A to point B (e.g., a map), and may receive in response, the navigation pathway shown in FIG. 7 as previously traveled by the robot 708. In this manner, the robots may share information to enable learning of the area 706.

In addition, the robot 700 may have limited memory, and in one example, to enable and manage updates, a server may include or store data to be provided to the robot 700. For instance, the robot 700 may not download "the entire world" of data, but rather, may download data representing immediate surroundings into a local cache to perform actions, such as to traverse through a portion of the area 706. The robot 700 may download additional data when needed. Furthermore, downloads can occur from the server to the robot 700, or through peer-to-peer sharing (e.g., from the robot 708 to the robot 700). Still further, basic instructions for mobility, safety, and general robot operation can be stored on-board the robot 700, while instructions for higher-level functionality may be stored in the cloud 702 and accessed by the robot 700 as needed. In some examples, the robot 700 can use "Just in Time" downloading where high level data can be downloaded first, followed by lower level data streamed as needed. In some examples, providing business logic stored in the cloud 702 enables fleet-wide upgrades to all robots.

In addition, "slug" trails may be used for shared information (i.e., information that may be used for object recognition). A slug trail may be indicative of previous requests and matching responses. Thus, in a multi-node system, the request/response can be cached so that future requests hit an answer sooner in path. For example, if the robot 700 is navigating through the area 706 and notices a hallway is blocked, the robot 700 can publish an update on the pathway so that other robots learn of the obstacle and other problems/constraints, and may request/receive an alternate pathway. Any interaction that the robot 700 experiences can be published to the cloud so that the robot 700 logs interactions to be shared amongst all robots. Specific locations may trigger robots to download new information. For example, when entering a new room, data about the room may be retrieved that was collected by another robot.

d. Inventory/Differential Functions

Figure 10:
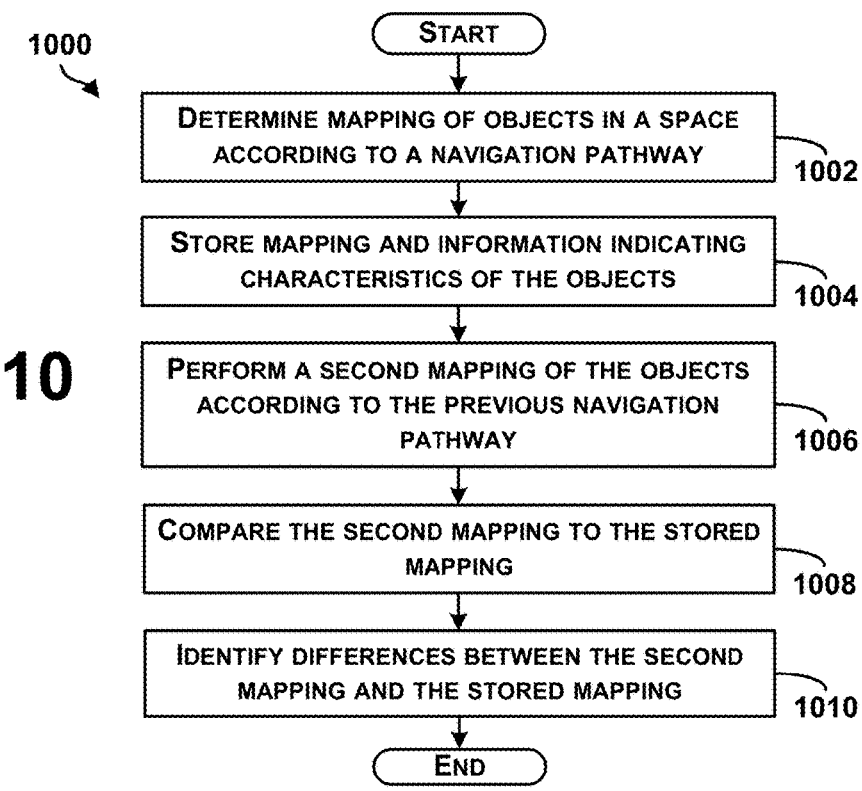
FIG. 10 is a block diagram of an example method for mapping of objects in an area and performing inventory of objects.

FIG. 10 is a block diagram of an example method for mapping of objects in an area and performing inventory of objects, in accordance with at least some embodiments described herein. Method 1000 shown in FIG. 10 presents an embodiment of a method that, for example, could be used with the systems 100 and 400, for example, and may be performed by a device, such as the devices illustrated in FIGS. 1-4, or components of the device. The various blocks of method 1000 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive, or any other type of non-transitory media described elsewhere herein.

At block 1002, the method 1000 includes determining a mapping of objects in a space according to a navigation pathway. For example, a robot may move through an area and perform object recognition and generate a map, as described above using method 500 in FIG. 5 and method 800 in FIG. 8. The robot may be configured to follow a predetermined navigation pathway through an area, or may follow a random navigation pathway through the area. The robot may store or associate the navigation pathway with the determined mapping of the area, so that a record is formed of the navigation pathway used to determine the mapping. In one instance, based on the navigation pathway, the mapping may be different (e.g., a robot may not map an entirety of an area or take account a full inventory of all objects in an area).

The mapping of the area may be, in one example, an inventory of objects in the area. As the robot traverses through the area capturing images and performing object recognition, the robot may determine what objects are present, and determine locations of objects in the area.

At block 1004, the method 1000 includes storing mapping and information indicating characteristics of the objects. For example, the robot may store the mapping locally on memory of the robot or within the cloud. The robot may further store associated information indicating characteristics of the objects with the mapping of the objects, such as, metadata describing details of the objects (weight, color, model number, size, shape, etc.).

At block 1006, the method 1000 includes performing a second mapping of the objects according to the previous navigation pathway. For example, at a later time, the robot may perform another mapping of the area using the same navigation pathway so as to take an inventory of the area at the later time. The robot may follow the same (or substantially the same) navigation pathway previously used so that the same (or substantially the same) mapping of the area and objects in the area can be determined.

At block 1008, the method 1000 includes comparing the second mapping to the stored mapping, and at block 1010, the method 1000 includes identifying differences between the second mapping and the stored mapping. By comparing the two mappings, differences between the mappings can be identified to determine differences in the inventoried objects.

As an example using the method 1000 of FIG. 10, a user may configure an area (e.g., bedroom) into a default configuration (e.g., where all clothes are picked up off the ground, items are arranged and the room is cleaned). The user may request the robot to perform a mapping and inventory of objects in the bedroom with the bedroom in the default configuration. Afterwards, if the user has misplaced an item, the user may request the robot to perform a new inventory of the room, and the new inventory can be compared to the default inventory to determine what changes have been made to the bedroom (e.g., what objects are not in the default location).

As another example using the method 1000 of FIG. 10, a user may configure a stock room at a retail store into a default configuration (e.g., all shelves are fully stocked). The user may request the robot to perform a mapping and inventory of objects in the stock room with the room in the default configuration. Afterwards, the user may request the robot to perform a new inventory of the stock room to determine what items have been sold. The new inventory can be compared to the default inventory to determine what changes have been made to the stock room, such as, to indicate a current supply of items in the stock room that can be used to configure future orders. The default inventory map may thus be a benchmark map of the room in a clean state, so that subsequent maps can be performed to determine a differential between the benchmark and a current condition of the room.

Thus, in some examples, a robot may create an inventory of objects in a room or scene, along with a mapping of the objects to catalog all objects in the space and to store details of the objects (e.g., name, shape, color, last known location, etc.). The robot may have a navigation path that is followed to inventory a space, so that the same navigation path can be traversed to identify missing/new objects.

e. Voice Recognition/Control

Figure 11:
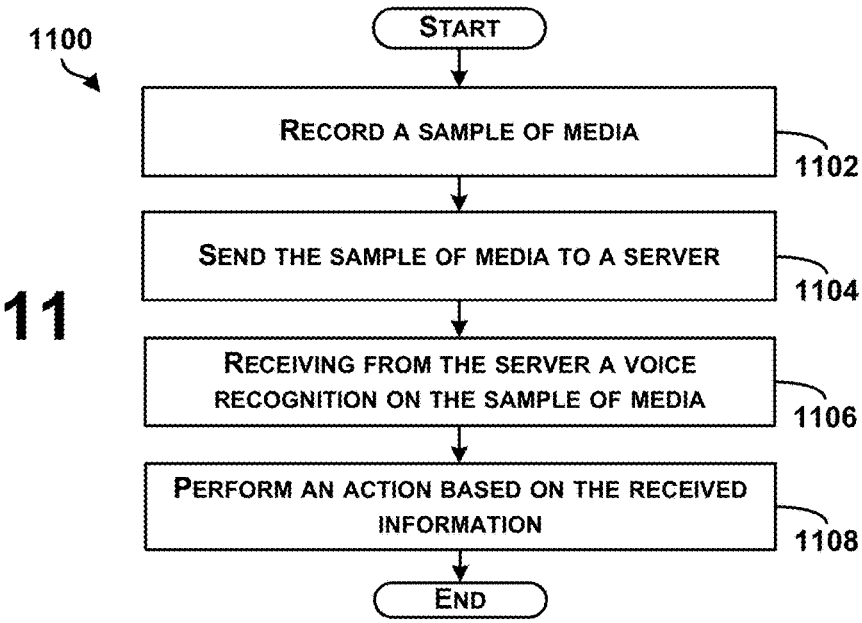
FIG. 11 is a block diagram of an example method for performing voice recognition/control by a robot, all arranged in accordance with at least some embodiments described herein.

FIG. 11 is a block diagram of an example method for performing voice recognition by and/or control of a robot, in accordance with at least some embodiments described herein. Method 1100 shown in FIG. 11 presents an embodiment of a method that, for example, could be used with the systems 100 and 400, for example, and may be performed by a device, such as the devices illustrated in FIGS. 1-4, or components of the device. The various blocks of method 1100 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive or any other type of non-transitory storage media described elsewhere herein.

At block 1102, the method 1100 includes recording a sample of media. For example, a user may interact with a robot by speaking to the robot, and the robot may record the speech of the user. The robot may record samples of speech from other areas as well (e.g., televisions, radio, etc.) and of other types of media, such as music, video, live performances, etc.

At block 1104, the method 1100 includes sending the sample of media to a server. For example, the robot may be configured to communicate with a server (e.g., the "cloud"), and may send the sample of media using wired or wireless communication to the server.

At block 1106, the method 1100 includes receiving from the server a voice recognition on the sample of media. The server may use any number of known techniques for performing voice recognition, and may provide a response to the robot. The voice recognition response may include a textual equivalent of the speech, such as when the server performs speech to text processes.

At block 1108, the method 1100 includes performing an action based on the received information. In one example, the voice recognition response may also include a command or instructions indicating actions for the robot to perform. In this example, the server may perform a voice recognition, and may further identify actions to be performed by the robot in response to the voice recognition. As a specific example, the user may speak "call John" to the robot. The robot may record the speech and send the speech sample to the server. The server may recognize the speech, and return a voice recognition response to the robot with instructions for the robot to call a user named John at the phone number 555-1234. The robot may then initialize a phone call to John using internal phone capabilities. If the robot is not equipped with a wired or wireless telephone, the voice recognition response may further include instructions to the robot for how to initialize the phone call, such as to provide a map to the robot of where a telephone is located, provide a navigation pathway to the robot to instruct the robot how to traverse to the telephone, provide instructions how to use the telephone to the robot, and provide the phone number of John to the robot.

f. Contextual/Situational Robot Functions

A robot may perform any actions or queries to the cloud as described herein based on contextual or situational information.

In an example, a robot may have information relating to a local environment in which the robot operates (e.g., a local map, a location, etc.) and this information can be used as constraints for recognition systems that are used to identify objects within captured data by the robot. For example, if the robot is in an office, the robot may access an "office" database of objects within the cloud to perform object or data recognitions. Thus, the robot may send to the cloud a query to determine or identify an object within gathered data, and the query may include contextual information, such as an indication of a location of the robot. The server may use the contextual information to select a database in which to search for a matching object.

Thus, in some examples, a robot may use location, or possible nearby objects as constraints into recognition systems to provide a context of the environment enabling object recognition to be performed using a subset or a limited set of nouns/verbs/objects to improve recognition accuracy.

As another example, the robot may operate with situational awareness such that a robot may inventory objects in a scene, and if given a command by a user, the robot can determine the content or interpret the meaning of the command based on a situation of the scene or by comparing with objects in the scene (e.g., command is to retrieve a cola from the refrigerator, and robot can use limited database warehouse of objects associated with "house" to quickly identify refrigerator/cola, etc.). The robot may be configured to use contextual as well as situational data to help perform decision making.

In still another example, a robot may perform actions using contextual/situational data, such as time of day, weather outside, etc. For example, at night a robot may be configured to move more slowly and make less noise to be quiet than as compared to operations during the day. In another example, in the morning a robot may offer coffee to a person as opposed to a soft drink. Other situational examples that may affect configurations of robot actions include if the weather is rainy, the robot may offer an umbrella to the person, or based on what a person is wearing, the robot may offer suggestions as to whether the person will be hot/cold due to weather. Thus, the robot may take context/situation into account, as well as whom the robot is interacting with when determining an appropriate response/function. Still further, a robot may make a sound of presence, intent, state, based on context/situations.

As still another example, a voice recognition database (or information from a voice recognition database) may be provided to a client device (e.g., robot) to enable the robot to perform voice/speech recognition locally. The voice recognition database may be provided based on a current state of the robot. As an example, if a robot is in an office setting, an office database for voice recognition may be provided to the robot to enable a voice recognition process to be performed more quickly than having the robot search within a database for all settings. Any situational or contextual information of the robot may be used to select a voice recognition database to provide to the robot. As other examples, a time of day, context of a conversation, location of the robot, etc. may be used individually or in combination to select a voice recognition database to provide to the robot.

5. Object Inventorying

Figure 12:
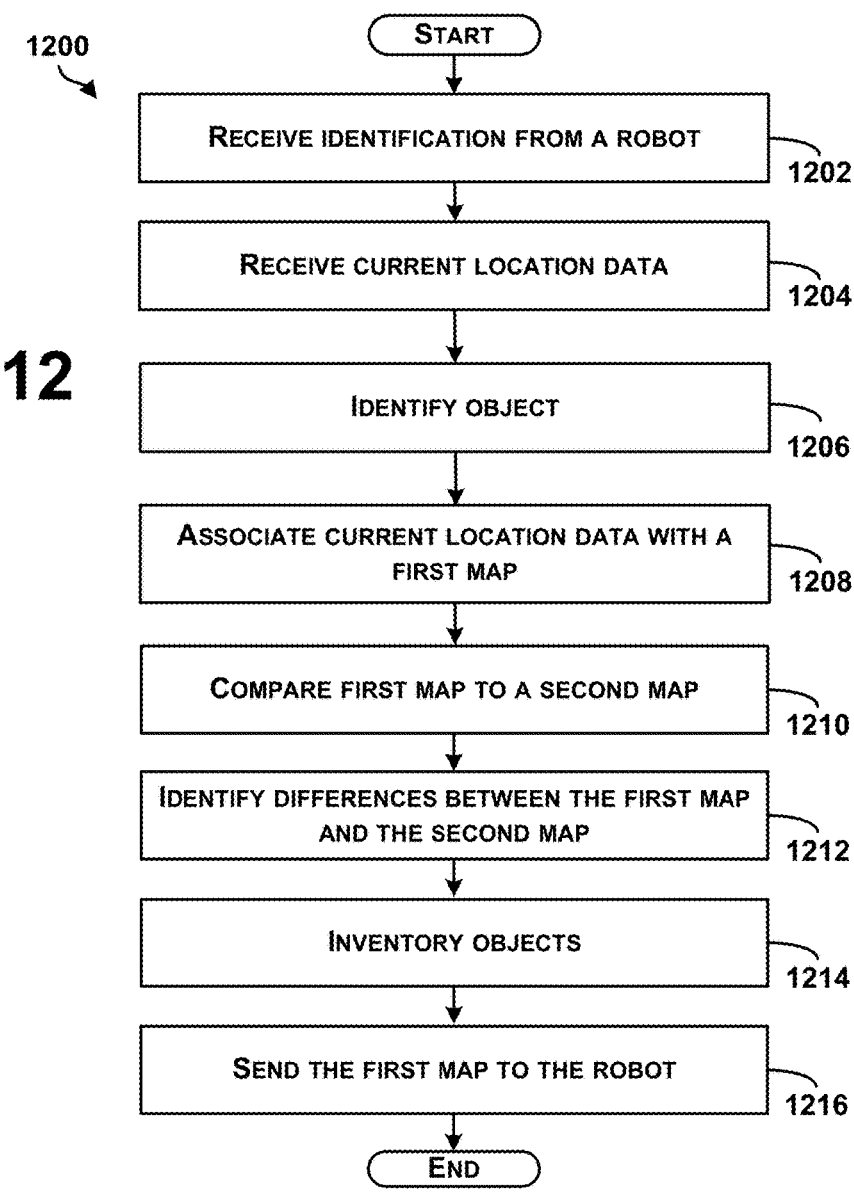
FIG. 12 is a block diagram of an example method for processing data from a robot.

FIG. 12 is a block diagram of an example method for processing data from a robot, in accordance with at least some embodiments described herein. Method 1200, shown in FIG. 12, presents an embodiment of a method that, for example, could be used with the systems 100 and 400, and may be performed by a device, such as the devices illustrated in FIGS. 1-4, or components of the device. The various blocks of method 1200 may be combined into fewer blocks, divided into additional blocks, and/or removed based upon the desired implementation. In addition, each block may represent a module, a segment, or a portion of program code, which includes one or more instructions executable by a processor for implementing specific logical functions or steps in the process. The program code may be stored on any type of computer readable medium, for example, such as a non-transitory storage device including a disk or hard drive, or any other type of non-transitory media described elsewhere herein.

At block 1202, the method includes receiving identification data from a robot. The identification data corresponds to an object detected by the robot. The identification data may be identification information from a tag or beacon associated with the object, an image of the object, any tangible aspect associated with the object (e.g., texture, size, weight, etc.), voice data associated with the object, red green blue plus depth (RGB-D) data, image and/or range data, structure-from-motion data, etc. In some embodiments, the identification information may be from a signal or beacon, a 1D barcode, a 2D barcode, an RFID, an NFC chip, etc., attached to or otherwise associated with the object. For example, the object may be a sofa. A RFID may be attached to the sofa and may be used to identify the sofa. A robot or other computing device may be able to scan or otherwise read identification information from the RFID, and send the identification information from the RFID or information encoded in the RFID to a server. The server may be located in or otherwise associated with a cloud computing system, such as the cloud configurations described elsewhere herein.

In some embodiments, the identification data may be an image of the object. The robot, server, cloud, etc., may use the image of the object to identify the object. In some embodiments, the server or the robot may also use the image of the object to ascertain an identifier that may be associated with the object, for example. Ascertaining the identifier associated with the object may be based on one or more of (i) the image of the object, (ii) the identification information read from the signal, 1D barcode, 2D barcode, RFID, NFC chip, etc., associated with the object as described herein, and/or (iii) any other identification data associated with the object that the robot may collect.

In further embodiments, the identification data may be associated with RGB-D data. RGB-D data may be used to build a 3D image or map of the object, an area, etc. In an example, the robot may obtain RGB-D data of the object using a depth camera sensor or any other sensor that may be capable of combining visual and/or 3D shape information. The robot may send the RGB-D data to the server, which may associate the RGB-D data with an object using a database lookup, for example.

In some embodiments, the identification data may be associated with metadata derived from RGB-D data and/or image or range data associated with the object. Image or range data may be associated with a 3D image or map of the object, an area, etc., and may be generated from any number of sensors including stereo camera sensors, depth camera sensors, ranging sensors, sonic sensors, etc. The robot may send the image or range data to the server, which may associate the image or range data with an object using a database lookup, for example. Moreover, in some embodiments structure-from-motion data from a camera may be post-processed by the robot and/or server, compared to stored object data using a database lookup, and used for purposes of object recognition and/or identification.

In further embodiments, the identification data may be associated with voice data received from the object, user, robot, etc. Voice data may include any media including spoken words, vocalizations, background noises, etc. The robot may obtain the voice data and perform voice recognition on the voice data, as described in more detail herein. In embodiments, the voice recognition may be used to recognize the name of the object, an action associated with the object, etc. For example, the robot may recognize the word "table" and identify an object in a database that may be associated with the word "table". Optionally, the voice recognition and object identification may be performed by the server.

At block 1204, the method includes receiving current location data. The current location data may indicate the current location of the object within an area. In some embodiments, the robot, a sensor, the object, a third party, etc., may obtain the current location of the object and send the current location to the server.

The process of obtaining current location data may vary in different embodiments. For example, the robot may obtain current location data via one or more sensors, such as GPS, radar, etc., which may be associated with the robot. The current location data may be exact or an approximation (e.g., based on calculations from the location of the robot). In embodiments where the robot obtains an approximate current location, the robot (or the server) may apply one or more algorithms to the approximate current location to identify a better approximation of the current location. The robot may send the current location data, or an approximation thereof, to the server.

In some embodiments, sensors independent from the robot may be used to obtain the object's current location and to send the current location to the server, robot, user, or object. For example, the object may have a beacon (or similar construct) located on the object. A GPS may be used to identify the current location of the object via the beacon and to send the current location of the object to the robot, for example. In some embodiments, the GPS may also send an object identifier that allows the robot to associate the current location with the object.

In further embodiments, current location data may be stored at the object using an RFID, NFC chip, etc. The process of storing the location data on the RFID, NFC chip, etc., may include the robot, the user, or a computing device, determining the current location of the object and writing the current location of the object to the RFID, NFC chip, etc., for example. This process may occur periodically, such as when the robot performs a scan of an entire area or when the user adds location data to (i) the RFID, NFC chip, etc. or (ii) one or more databases that store an association between location data with a particular RFID, NFC chip, etc. Optionally, the process may be prompted when the object recognizes that the object has been moved.

In one example, an electronic picture frame may include an RFID as an identifier. The electronic picture frame may also include a sensor, such as a GPS, a motion detector, or an accelerometer, which may be configured to identify when the picture frame has been moved. Once moved, the sensor may obtain new GPS location data, calculate the new location data, etc., and write the new location data to the RFID, for example. The robot may obtain the location data from the object during a scan of the object and send the location data to the server, for example. In some embodiments, the robot may use a partially supervised method for learning objects and locations of objects. Thus, for example, if the robot is not able to identify an object or its location, then the robot may prompt the user to enter the information and use entered information to reinforce one or more learning algorithms.

At block 1206, the method includes identifying an object. The server may identify the object by one or more of (i) analyzing the image of the object, (ii) looking up identification information from a tag or beacon associated with the object in a database, and/or (iii) analyzing any other information data about the object that might be collected by the robot (e.g., weight, dimensions, texture, etc.). As part of identifying the object, the server may determine an identifier associated with the object. In some embodiments, the database may be indexed by the identifier. However, the database may alternatively be indexed by other data as well. The identifier in the database corresponding to the object may be associated with a type of identifier (e.g., barcode, RFID, object recognition, etc.), a description of the object, a manufacturer of the object, one or more computer-executable instructions that the object may be capable of responding to, the current location of the object, what time the object was at the current location, one or more past locations of the object, what time(s) the object was at the one or more past locations, a map associated with the current location of the object, a map associated with one or more past locations of the object, the owner of the object, etc. The identifier may also be associated with a confidence interval, which may indicate the likelihood that the object has been associated with the correct identifier.

At block 1208, the method includes associating current location data with a first map. A map may include a collection of data associated with an area, for example. The collection of data may include data associated with the identifier of the object. The area may be a room, office, city, state, country, etc., and may be defined by a coordinate or other location based system. The map may be visually represented by a diagram.

In some embodiments, multiple maps may cover the same area. For example, a first map may be of a table within a room and another map may be of the room. Similarly, yet another map may be of a house that includes the room and the table. Rather than storing duplicative maps, the server may store a unique primary map (e.g., of the world) that may be divided into unique smaller maps, such as of a room or of a city. The smaller maps may be predefined, such as by the boundaries of a room, or may be created ad hoc. Ad hoc maps may include an area having a proximity to the current location of the object, the past location of the object, the robot, the user, etc.

Maps may be public or private. Public maps may be accessed by any robot, user, etc. Private maps, however, may be accessed by limited robots, users, etc. Access may be limited by various authentication and/or authorization mechanisms. For example, the robot may be in a room having confidential material. The robot may scan the room and identify an object within the room, such as a sofa. The robot may also obtain current location data associated with the sofa. The identification data and the current location data may be sent from the robot to the server. Upon receipt of the location data, the server may add the location data to the database. The server may also identify a map associated with the current location of the sofa. The map may include private permissions that may restrict the robot from accessing the map of the room or portions of the room without first being authenticated (e.g., via a digital signature) and authorized access to the map of the room.

At block 1210, the method includes comparing the first map to a second map. The first map may be the map associated with the current location of the object. The second map may be a map associated with a past location of the object. The first map and the second map may be maps of the same area. For example, the first map and the second map may be of the same area if the object has remained in the same room. The first map and the second map may be maps of different areas when the object has moved to a different room.

In some embodiments, there may be multiple maps associated with past locations of the object. The number of maps may be proportionate to the number of past locations stored in the database. The method 1200 may include comparing the first map to the map associated with the past location chronologically preceding the current location. Optionally, the method 1200 may include comparing the first map to a map associated with a specific time. Thus, the user may request the first map be compared to a map associated with a past location that occurred one day, week, month, etc., prior to the current location, for example. The determination of which map associated with a past location may be compared to the first map may be determined by the user, robot, server, etc.

In some embodiments, the user, robot, server, etc., may determine a default or preferred map for the server to compare to the first map. The default or preferred map may be a map associated with a specific time period or a past location of the object. For example, the user may identify a second map having past location data associated with the last time the area was cleaned. The first map (e.g., with the current location of the objects) may be compared to the second map (e.g., of the clean area). In another example, the first map may include an inventory of what objects are currently in a store and the second map may include an inventory of what items were in the store one or two weeks prior. The first map (e.g., with the current objects in the store) may be compared to the second map (e.g., of the objects in the store one or two weeks prior.)

At block 1212, the method includes identifying differences between the first map and the second map. The differences may include a new object, a new location of an object, a missing object, etc. In some embodiments, the method may include identifying all differences between the first map and the second map. Alternatively, the method may include identifying specific differences between the first map and the second map. An example of a specific difference may include identifying the new location of a specific object located within the first map rather than identifying the new location of each object within the first map. In embodiments, the differences between the first map and the second map may be stored in the database having the object identifier or in an alternative database.

At block 1214, the method includes inventorying objects. The inventory of objects may be determined based at least in part on the comparison of the first map to the second map and the identification of differences between the first map and the second map. In some embodiments, an inventory of an entire map or portion thereof may be maintained in the database.

The inventory of objects may be maintained within the same database as the object identifier and the maps or in a different database. The database may be used to track inventory in any number of ways including maintaining a counter associated with one or more object identifiers, descriptions, etc. The counter may be represented in any number of bases. For example, assuming that the same types of objects share the same identifier, the counter may be used to determine how many of the objects having the same identifier are in an area. Thus, the counter may be used to determine how many cans of "soda x" having identifier "abc" are located within the area. In examples where each object has a unique identifier—regardless of whether the objects are the same—a binary counter may be used to represent the presence or absence of the object in the area. Thus, each can of "soda y" may have a unique identifier and the presence of each can of "soda y" may be represented in the database in a binary fashion.

In some embodiments, the server may reconcile the inventory of objects. The reconciliation process may use the information determined by comparing the first map to the second map and determining if additional objects may need to be added or removed for the first map and the second map to match. In some embodiments, the server, robot, user, etc., may add objects to or remove objects from the first map to facilitate the reconciliation. For example, the server may send computer executable instructions to the robot to cause the robot to remove an object from the first map if the object is not located in the second map. Similarly, the server may send computer executable instructions to the robot to cause the robot to add or retrieve an object when the object may be associated with the second map, but is not present in the area associated with the first map.

In some embodiments, the server may reconcile inventory by determining what objects are currently present in a storeroom and comparing the identifiers associated with the currently present objects to identifiers associated with objects that were present in the storeroom during the last inventory reconciliation. Optionally, the server may obtain or maintain a list of objects or identifiers that should be present in the storeroom, for example. The identifiers associated with the objects that are currently in the storeroom may be compared to the identifiers on the list of objects or identifiers that should be present in the storeroom. The difference may be analyzed by the server, robot, or user to determine whether inventory has been added, removed, adjusted, etc.

The inventory process may be periodic or event driven. Periodic inventorying may occur on an hourly, daily, weekly, monthly, quarterly, yearly, etc., basis. Event driven inventorying may occur when a user requests an inventory, when a searcher instructs the robot to search for an object, etc. In embodiments, the inventory of objects may be stored on the server or sent to the robot or user for storage.

At block 1216, the method includes sending the first map to the robot. The map that is sent to the robot may include the entire first map or a subset of the first map. In some embodiments, the robot may receive the first map and store the first map for future usage. For example, the robot may use the stored first map to determine where objects are located within the area. The robot may also use the stored first map as a reference for finding objects within the area.

Figure 13A:
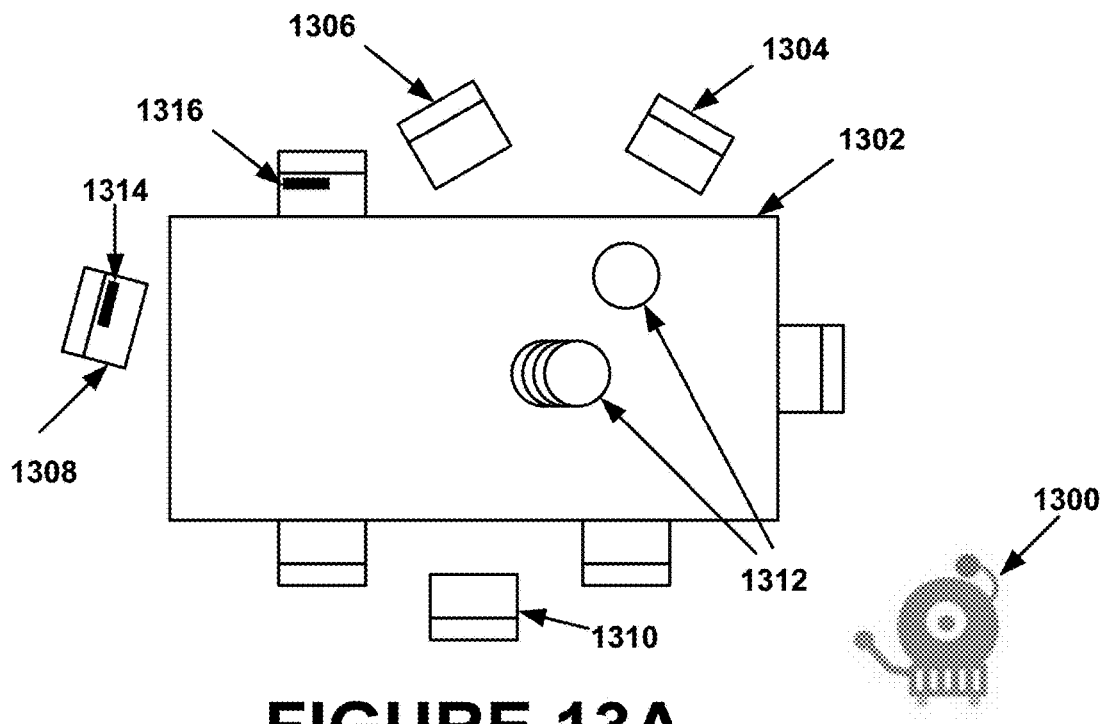
FIG. 13A is an example conceptual illustration of a first map of an area.

FIG. 13A is an example conceptual illustration of a first map of an area, in accordance with at least some embodiments described herein. In particular, FIG. 13A illustrates a robot 1300 within an area, such as a dining room, that has multiple objects. Example objects include a table 1302, multiple chairs 1304, 1306, 1308, 1310 surrounding the table 1302, and multiple dishes 1312 on the table 1302. In some embodiments, one or more of the objects may include an identifier 1314, 1316. The identifiers 1314, 1316 may be an RFID tag or any other type of identifier described elsewhere herein.

The robot 1300 may scan the area to identify objects within the area. The scan may include (i) examining individual objects in the area separately, (ii) examining the entire area (or a sub-region thereof) to identify individual objects in the area (or sub-region), or (iii) a combination of individual object examination and area (or sub-region) examination.

When examining an individual object, the robot 1300 may attempt to detect an RFID tag or other beacon associated with the object, such as the RFID tag 1314 associated with chair 1308. The robot may also or alternatively obtain one or more images of the object to identify the object. The robot may send the identification information obtained from the RFID tag or other beacon and/or images of the object to the server, and the server may attempt to identify the object and/or determine an identifier associated with the object based on the images or other information received from the robot.

The robot 1300 may optionally scan an entire area (or sub-regions thereof) for objects. The scanning may include the robot accumulating information from a plurality of RFID tags 1314, 1316 and/or images of the objects and sending the information from the plurality of RFID tags 1314, 1306 and/or images to the server. The server may receive the information from the RFID tags 1314, 1316 and/or the multiple images from the robot, and then use the information from the RFID tags 1314, 1316 and/or the images to identify the objects in the area. Identifying the object may include assigning or determining an identifier to the object based on an analysis of the image data or a lookup of the identification information read from the RFID tags. In some embodiments, the server may send a request to the robot for additional images of one or more objects within the area.

After assigning or determining the identifier for the object, the server may also determine a likelihood that the object has been associated with the correct identifier. This likelihood may be determined using any number of statistical algorithms. In some embodiments, the likelihood that the object is associated with the correct identifier may need to reach a threshold before the identifier is associated with the object. The threshold may be a percent certainty and may vary between objects, robots, users, etc. Thus, the threshold may be higher when the object is a specific object (e.g., a white plate with a blue boarder) compared to when the object is a less specific object (e.g., a plate).

In addition to identifying objects during a scan of an area, the robot 1300 may also identify a location associated with identified objects. For example, the robot 1300 may include location sensors (e.g., GPS, sonar, etc.) that allow the robot to identify the location of one or more objects in an area. Spatial sensors may also or alternatively be used to determine the location of the object. The location data may be obtained periodically or upon the happening of an event, such as a user, server, etc., requesting that the entire area or portion thereof be scanned. The robot 1300 may send the location data to the server when the data is obtained, when the robot has completed a scan of the area, upon a specified time, etc.

In an example, the robot 1300 may be performing a weekly scan of objects in the dining room. As part of the scan, the robot 1300 may examine the table 1302 for an RFID tag or other type of tag or beacon. Having found no tag or beacon, the robot 1300 may obtain one or more images of the table 1302 and send the one or more images to the server, and the server may identify the table 1302 and/or determine an identifier associated with the table 1302 based on the one or more images received from the robot. After or while the determination is being performed at the server, the robot 1300 may obtain location data for the table 1302 using a GPS or other sensor, for example. The robot 1300 may send the location data to the server and/or store the location data locally on the robot 1300 until the server has identified the table and/or determined an identifier for the table.

After sending the images and location data of the table 1302, the robot 1300 may continue the scan and identify a next object in the room. The next object may be one of the chairs 1304, 1306, 1308, 1310 or one of the dishes 1312, for example. When the robot 1300 examines the chair 1308, the robot 1300 may recognize a barcode identifier 1314 on the chair 1308. The robot may send the information from the barcode identifier 1304 to the server along with location data associated the chair 1308. The robot 1300 may continue to scan the area until all (or at least a desired subset of) the objects have been examined and/or identified. Optionally, the robot 1300 may continue scanning an area for objects until a predetermined time period has elapsed, until a specified object is identified, until the robot 1300 receives a command to stop scanning, etc. The robot 1300 may obtain location data associated with individual objects during or after the scan and send the obtained location data to the server.

The server may receive the identification data (e.g., one or more of the images, information from tags or beacons, etc.) and the location data from the robot 1300 and store the identification data and location data in a database. The server may also determine identifiers associated with the objects, and associate the determined identifiers and location data with a first map. The first map may be of the area (e.g., the dining room) or a superset (e.g., the house) or subset (e.g., the table) of the area.

A number of factors may be considered when determining which map to associate with the identification data and location data. For example, the server may identify one or more maps that include the location information associated with all or a majority of the determined identifiers. Alternatively, the robot 1300 may send or designate the map that may be associated with the identification data and location information. Once the map is determined, one or more of the determined identifiers and/or the location information associated with the determined identifiers may be added or otherwise associated with the map. The server may store this map as the first map.

Figure 13B:
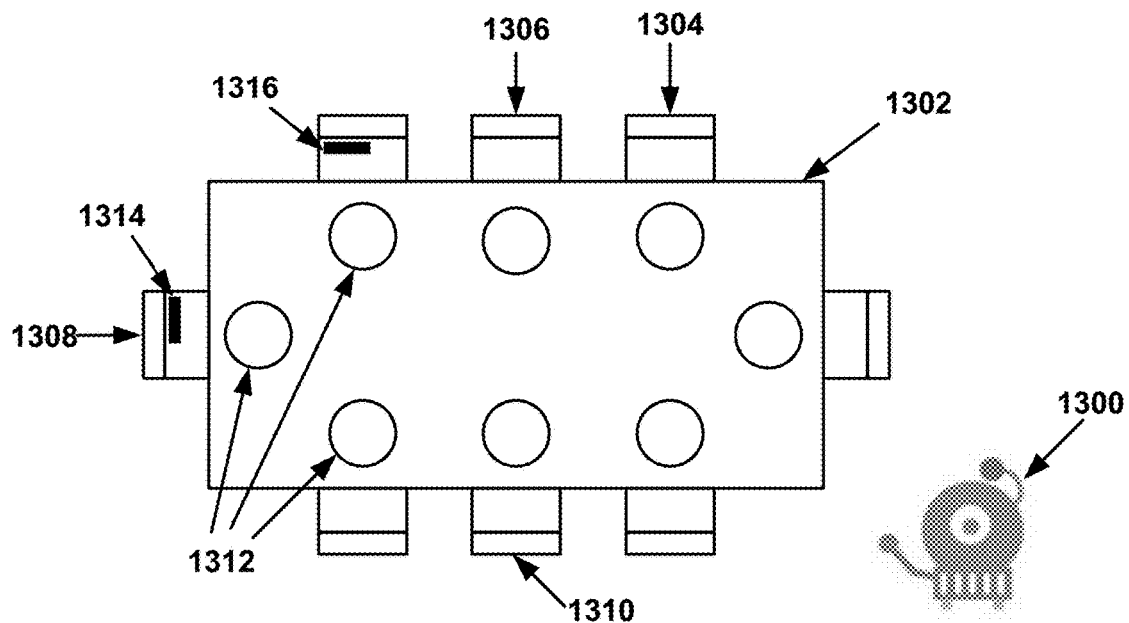
FIG. 13B is an example conceptual illustration of a second map of an area.

FIG. 13B is an example conceptual illustration of a second map of an area, in accordance with at least some embodiments described herein. The second map may represent the same or similar area as is represented by the first map. Thus, as illustrated in FIG. 13B, the second map may represent a dining room having table 1302, multiple chairs 1304, 1306, 1308, 1310 surrounding the table 1302, and multiple dishes 1312 on the table 1302. The second map may differ from the first map in that the second map may represent the location of one or more of the objects in the area at a desired state or at a different point in time.

In the example illustrated in FIG. 13B, the second map may represent a desired state of the dining room. The desired state or configuration may be based on a user programmed map of the dining room or may be based on a past scan of the dining room. In this example, the second map may be an organized version of the first map.

The server may compare the first map to the second map to determine if there are differences between the first map and the second map. If differences exist, the server may identify the differences and store information associated with the differences in the database. The server may use the differences to inventory the objects in the area. The inventory may include the movement of an object from a first location to a second location, the addition or removal of an object, etc.

In an example, the server may determine that the second map differs from the first map in that the second map includes straightened and pushed in chairs 1304, 1306, 1308, 1310, and also include dishes 1312 set in front of the chairs 1304, 1306, 1308, 1310. The second map may also include more dishes 1312 than illustrated in the first map. The server may use this information to inventory the objects in the first and/or second map.

Upon recognizing the differences between the first and the second maps, the server may send the differences to the robot 1300 in addition to the first and/or second map. The differences may be in a data format identifying the object, the current location of the object, the location of the object in the second map, etc. The data may also include a list or other data construct that identifies what objects and/or identifiers are missing, have been added, or have changed between the first map and the second map.

In some embodiments, the server may further identify where the missing objects are located. This may occur by the server scanning the database for the identifier and sending the most recent location of the object associated with the identifier to the robot 1300. Embodiments may also include the server sending data to the robot indicating where the added objects may be located.

The robot 1300 may perform an action in response to the receipt of the difference, first map, and/or second map from the server. The actions may include the robot 1300 straightening chairs, 1304, 1306, 1308, 1310 and placing dishes 1312 in front of the chairs 1304, 1306, 13080, 1310. The robot 1300 may recognize or be informed by the server that there are not enough dishes 1312 to complete the place setting, i.e., that the inventory of the dishes 1312 in the area is too low to complete the task. In response, the robot 1300 may locate additional dishes 1312 by determining where dishes 1312 having the same identifier, description, etc., are located and by retrieving the dishes 1312 from the identified location. In this manner, the robot 1300 may rearrange objects identified in the first map (perhaps along with additional objects not found in the first map) into desired positions based on a reference configuration defined in the second map.

Figure 14:
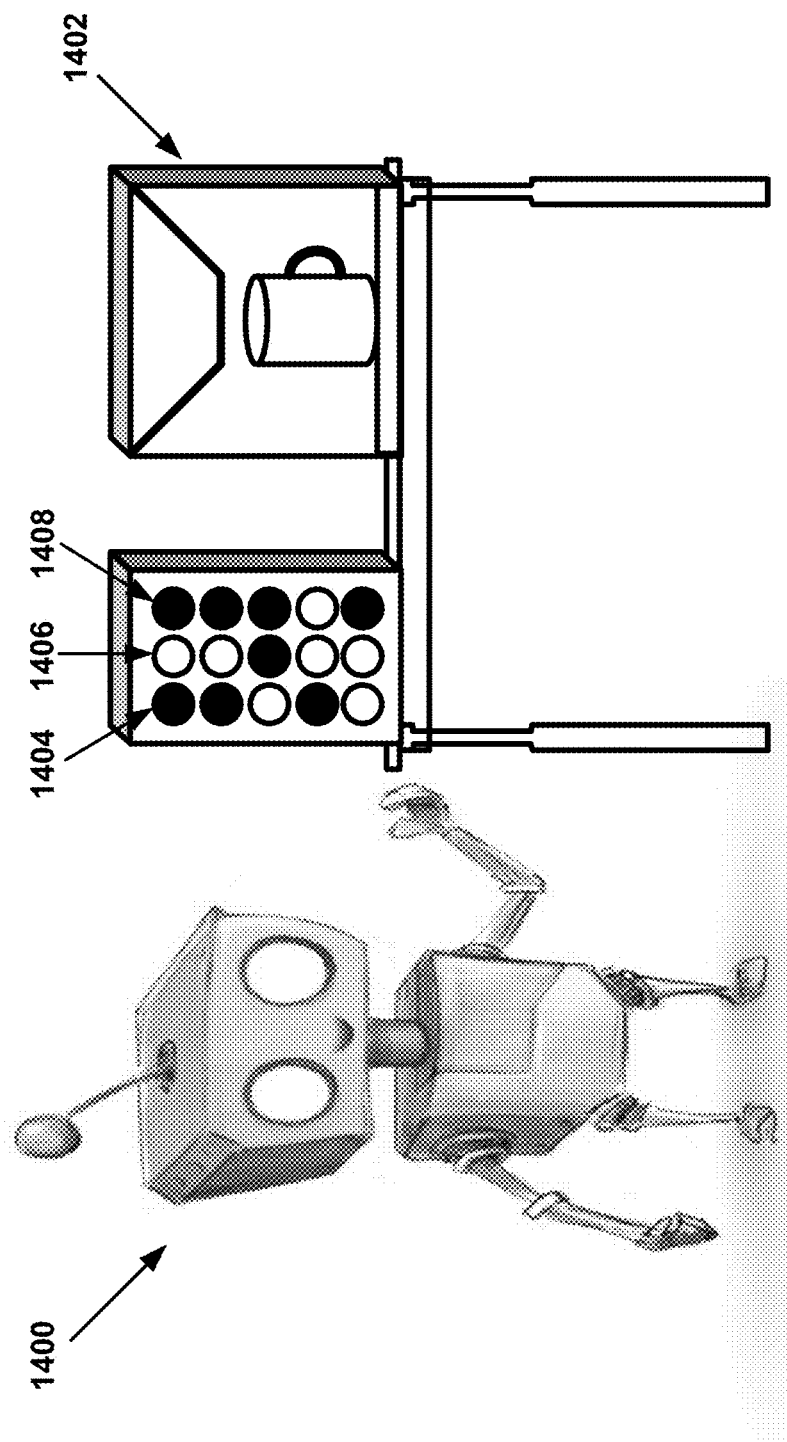
FIG. 14 is an example conceptual illustration of a robot interacting with an object.

FIG. 14 is an example conceptual illustration of a robot interacting with an object, in accordance with at least some embodiments described herein. In particular, FIG. 14 includes a robot 1400 interacting with a coffee machine 1402 and one or more types of coffee 1404, 1406, 1408. The coffee 1404, 1406, 1408 may be organized in rows, such that each row has a number of individual packets of coffee. All of the coffee 1404, 1406, 1408 may be the same type of coffee. Optionally, each row may represent a different type of coffee, for example. Therefore, coffee 1404 may be espresso, coffee 1406 may be a French roast, and coffee 1408 may be a flavored coffee.

Each individual packet of coffee 1404, 1406, 1408 may have a corresponding identifier. The identifier may be associated with a 2D barcode (e.g., a QR code) on the front of each packet of coffee 1404, 1406, 1408, for example. Other types of codes or identifiers could be used as well. The corresponding identifier may be a unique identifier for each packet of coffee or a unique identifier for each type of coffee. This may result in a first identifier associated with all packets of coffee 1404 that are espresso, a second identifier associated with all packets of coffee 1406 that are French roast, and a third identifier associated with all packets of coffee 1408 that are flavored coffee. In yet another embodiment, the same identifier may be associated with all of the packets of coffee 1404, 1406, 1408, regardless of whether the coffee 1404, 1406, 1408, is an espresso, French roast, or flavored coffee. Identifiers associated with the coffee 1404, 1406, 1408 may further vary based on the product, manufacturer, distributer, etc.

In one example operation, a user may ask the robot 1400 to prepare a cup of coffee. In response to the request, the robot 1400 may examine one or more of the coffee packets 1404, 1406, 1408 to locate a code such as a 2D barcode, for example. If the user specifies the type of coffee as French roast 1404, for example, the robot 1400 may read a code on a particular coffee packet, compare the read code to an internal list of codes to determine if the read code matches the requested type of French roast coffee 1404. Alternatively, the robot may send the code to a server for the server to determine if the code matches the requested type of French roast coffee 1404. If the code does not match the requested type of French roast coffee 1404, the robot 1400 may continue reading codes on the coffee packets until the robot 1400 (with or without the aid of the server) identifies a packet of French roast coffee 1404.

Additionally or alternatively, the robot 1400 may obtain one or more images of an individual coffee packet and analyze the one or more images (or portions thereof) to determine if the coffee packet is the requested type of French roast coffee 1404. Alternatively, the robot may send the one or more images of the coffee packet to the server for the server to analyze the one or more images (or portions thereof) to identify the type of coffee packet. The image analysis could be based on the color of the coffee packet, the shape of the coffee packet, logos or trademarks on the coffee packet, optical character recognition of text appearing on the coffee packet, etc. If the coffee packet is determined to not match the requested type of French roast coffee 1404, the robot 1400 may continue obtaining images of different coffee packets until the robot identifies a packet of French roast coffee 1404.

Instead of examining individual objects, the robot 1400 may alternatively perform an entire scan of the area (e.g., the coffee bar) to identify all of the objects at the coffee bar. The robot may send any codes that it read during the scan (and/or any images of objects obtained during the scan) to the server, and the server may identify which coffee packets correspond to the requested French roast coffee 1404.

The robot 1400 may also obtain a location associated with one or more of the packets. The associated location may correspond to an individual packet or a group of packets. For example, each coffee packet may have a corresponding location, or the set of coffee packets at the coffee bar may all have the same corresponding location. Thus, the robot may read a code on a packet of espresso coffee 1406, and use one or more sensors to identify a relative or exact location (or at least substantially exact location) of that particular packet of espresso coffee 1406. The location of the espresso packet may be determined using a GPS, for example, and may be defined by latitude, longitude, and altitude coordinates, for example. Other location systems could be used as well.

In addition to an exact (or at least substantially exact) location, the robot may additionally or alternatively determine a relative position of the particular coffee packet. The relative location may be determined by reading codes on other coffee packets 1406, 1408 around the espresso coffee packet 1406 and defining the location of the espresso coffee packet 1406 as a certain distance to the left of the French roast coffee packet 1404, an even farther distance to the left of the flavored coffee packet 1408, a certain height relative to the robot 1400, etc. The robot 1400 may send the location data to the server.

The server may receive the code read from the coffee packet and the location data associated with the coffee packet. The server may perform a lookup using the code to determine if the code is in the database. In some embodiments, the code may be a unique key or not. A code may be unique if the code is associated with a single identifier stored in the database. A may be non-unique if the code is associated with more than one identifier stored in the database. If the code is not a unique key, the server may identify one or more of the objects having the same code and use other stored data to determine the correct identifier (of the multiple identifiers) to be associated with the object based on the code. Thus, for example, if the server receives a code associated with the packet of espresso coffee 1406 and determines that the same code is also associated with a hammer, the server may recognize that the robot 1400 is in a coffee bar and, therefore, (i) determine that the object is a packet of espresso coffee 1406 and not the hammer, and (ii) associate the packet of espresso coffee 1406 with its appropriate identifier in the database. As described elsewhere herein, the database may be indexed by identifiers, and individual identifiers may be associated with (i) image information, (ii) codes or other types of identification information obtained from barcodes, RFID tags, beacons, etc., (iii) location data, (iv) maps (e.g., the first and second map), or (v) other information that might be useful to associate with a particular object. In some embodiments, the server may assign a confidence level to the identifier determined for an object, such as a confidence level that the object has been correctly identified as the packet of espresso coffee 1406 instead of a hammer. In further embodiments, the server may assign a confidence interval indicating the likelihood that the code read from the coffee packet correctly corresponds to the identifier associated with the packet of espresso coffee 1404 that is stored in the database.

Once the lookup has been performed, and the object has been identified in the database, the robot may add the location data associated with the object to the database. The process of adding the location data to the database may vary in different embodiments. For example, some embodiments may add the location data to the database each time the location data is obtained. This location data may be related to the relative or exact location of the object. The server may also add a timestamp to the location data in the database. The timestamp may correspond to the time at which the object was identified, the time at which the location data was entered into the database, etc. In another embodiment, the server may add location data to the database only if the location data has changed since the last timestamp. Thus, a new location of the object may result in a new entry into the database, whereas a static location of the object may not result in a new entry into the database. A number of variations of these embodiments are possible. For example, in one variation, the server may not enter the location of the object unless the location has changed; however, the server may update the timestamp to indicate the last time the object was identified at the location, for example. The server may use the timestamp to determine how much time has passed since the last time that a particular object was identified at a particular location and, if a predefined amount of time has passed, send a message to the robot with instructions to locate the particular object to obtain a current location of the particular object.

The server may associate the current location of the object, e.g., the coffee 1404, 1406, 1408 with a first map. The first map may represent the coffee bar illustrated in FIG. 14, for example. The first map may be defined by a coordinate system and include one or more objects currently located within the bounds of a set of coordinates corresponding to the first map. In embodiments, the first map may also be defined by a map identifier, which may be used to identify the first map from other maps.

One or more objects may be associated with the first map. The process of determining which objects are associated with the first map may include a database search for all objects currently associated with the first map's map identifier. Optionally, the process may include a database search of all objects that are located within the bounds of the first map. This database search may analyze whether the timestamp associated with the object is current or has been updated. Location data associated with a current timestamp may be associated with the first map, for example.

The database and/or the first map may be updated at various intervals. The intervals may be related to the frequency at which the robot scans for objects, when there is a change in location data associated with the first map, upon a predetermined schedule, etc. The process of updating the first map may include updating the entire first map, updating a subset of the first map, or creating a new version of the first map or a subset thereof.

In an example, the server may update the first map associated with the coffee bar. The update may include identifying the current location of each object in the coffee bar and updating the first map to include the current location of each object in the coffee bar, regardless of whether the current location of an object has changed since the last update. Optionally, the update may include identifying the current location of objects in a subset of the coffee bar and updating the current location of the objects within the subset of the coffee bar, regardless of whether the current location of an object has changed since the last update. An example subset may include the section of the coffee bar with the coffee 1404, 1406, 1408. In another example, the server may update the first map by creating a new version of the first map (or a subset thereof). The new version of the first map may include those objects that have moved locations since the last update. The server and/or robot 1400 may use the new version of the first map as an update or supplement to the original first map. In this way, the server and/or robot 1400 may limit the number of objects that may be updated at one time, for example.

The server may compare the first map to a second map. Similar to previous examples, the first map may include the current location of the objects in the coffee bar. The second map, however, may include the prior location of one or more objects in the coffee bar. Both the first map and the second map may be defined by a plurality of coordinates, which may represent the bounds of the area and/or the location of the objects within the area.

In one example, the server may compare the objects that are currently located in a coffee bar to objects that were located in the coffee bar the week prior. In some embodiments, the server may have already identified the objects in the first map, i.e., the current location of the objects in the coffee bar, by having the robot 1400 perform a scan of the coffee bar and recording the results of the scan. The server may then identify the objects in the second map by identifying a range of timestamps that occurred one week prior and determining if the timestamps are associated with objects that were located in the area defined by the second map. Using this process, or a similar series of database lookups, the server may develop the second map. The server may then compare the first map and the second map to determine differences between the two maps. These differences may be represented as data in the database and/or pictorially as a map, chart, or the like, for example.

The server may use the differences identified in the comparison of the first map to the second map to inventory objects within the area. For example, the server may create an inventory of how many total packets of coffee 1404, 1406, 1408 are present in the coffee bar. The server may also determine how many packets of espresso coffee 1404, French roast coffee 1406, or flavored coffee 1408 are available. The server may compare one or more of these numbers to a desired or preferred number of coffee packets to determine if the inventory of coffee packets is low and if additional coffee packets may need to be ordered. Thus, for example, the server may determine that only one French roast coffee packet 1404 is left and take one or more actions, which may include (i) notify the user to order additional French roast coffee packets 1404, (ii) instruct the robot 1400 to notify the user to order additional French roast coffee 1404, (iii) order additional French roast coffee packets 1404, or (iv) instruct the robot 1400 to order additional French roast coffee packets 1404. Optionally, the server may take any of the previously-listed actions in response to determining that the quantity of French roast coffee packets 1404 has dropped below a predefined level.

The server may also determine a rate in which objects are being used. The rate may be calculated based on how many objects were consumed and/or removed in the first map within a predefined period of time. The server may determine this rate by determining how many of the objects were present in a prior inventory, how many of the objects are present in the current inventory, and how much time has elapsed between the prior inventory and the current inventory. When dealing with non-consumable objects, such as a table or coffee machine, the server may measure the rate in which the object is being used by the wear and tear on the object. Thus, a coffee machine that is dented, frequently used, malfunctions, etc., may have a higher wear and tear than a new coffee machine. When dealing with consumable objects, such as coffee packets 1404, 1406, 1408, the server may measure the rate at which the coffee packets 1404, 1406, 1408 are consumed. The server may maintain statistics on the rate to determine when the inventory is likely to be depleted. The server may use the rate to determine how much and when additional inventory may need to be purchased, for example.

The server may use the inventory data to determine what objects are being used and what objects are not being used. For example, the server may analyze how much flavored coffee 1408 has been consumed throughout the past week and determine that no flavored coffee 1408 has been consumed. In some embodiments, the server may determine the last time flavored coffee 1408 was consumed by searching one or more previous inventory records on the database. The results may indicate that no flavored coffee 1408 was consumed in the past month. Based on this information, the server may determine if the flavored coffee 1408 has expired by comparing the current date to an expiration date that may be associated with one or more of the flavored coffee 1408 identifiers in the database. If the flavored coffee 1408 has expired, the server may notify the user and/or may send computer executable instructions to the robot 1400 to cause the robot 1400 to remove one or more of the flavored coffee 1408 from the coffee bar and discard the flavored coffee 1408, for example. The server may also notify the user that the flavored coffee 1408 is not being consumed at a suitable rate (e.g., a rate that would prevent spoilage) and may limit or refrain from ordering additional flavored coffee 1408 in the future. In some embodiments, the server may use analytics to determine an alternative product that may be consumed at a quicker rate than the flavored coffee 1408.

In some embodiments, the server or user may determine an optimal inventory. This may be performed by the server analyzing previous purchases (e.g., previously added objects) and consumption rates (e.g., the rate at which the inventory is depleted) to determine an inventory that will last through a purchase cycle. Optionally, the optimal inventory may be created by a user and may be in the form of a list or map of an optimal or ideal amount and type of objects within an area, for example. The server may compare the optimal inventory to the inventory of the first map to determine what objects may need to be ordered. The server may provide a report of these objects to the robot or to the user (e.g., when the user or robot is shopping) in a list, map, or other data format. Alternatively, the user or robot may query the server for the report of the objects so that the user or robot may know what objects to pick up while shopping, for example. In some embodiments, the user may edit the list if the user determines that one or more of the inventory numbers, object descriptions, etc., are incorrect. The server may propagate the user edit to the database and may also use the user edit for analytic purposes, for example.

The server may track the history and movement of objects throughout one or more areas. The tracking may be performed by identifying which map or maps have been associated with the tracked objects in the past. This may be performed using a database lookup, for example. Once identified, the server may determine any trends in object movements. The server may use this data to determine the location of one or more objects that may have moved from one map to another, for example.

The server may send the inventory of objects, the first map, the second map, data associated with the differences between the first and the second map, etc., to the robot 1400. In some embodiments, the server may also send one or more computer executable instructions to the robot 1400 that are executable to cause the robot 1400 to perform one or more actions such as removing particular objects from the particular object's current location in the first map, adding objects (e.g., when the second map has more objects than the first map), and removing objects (e.g., when the first map has more objects than the second map).

In an example, the server may send the robot 1400 data indicating that there is only one French roast coffee packet 1404 located in the coffee bar. The server may also send the robot 1400 data indicating that additional French roast coffee 1404 is located in the pantry, i.e., in a different area associated with a different map. The server may have identified the existence of the additional French roast coffee 1404 by tracking the movement of the French roast coffee 1404 in the database from the time it entered into the house, office, or café, up to the current time, for example. The server may send the location of the additional French roast coffee 1404 to the robot 1400 along with computer executable instructions for how to go to the pantry, pick up the additional French roast coffee 1404, and put the additional French roast coffee 1404 in the coffee bar, for example. In this way, the robot 1400 may use the inventory from the server to determine what object or objects the robot 1400 may need and where the object or objects are located.

Figure 15:
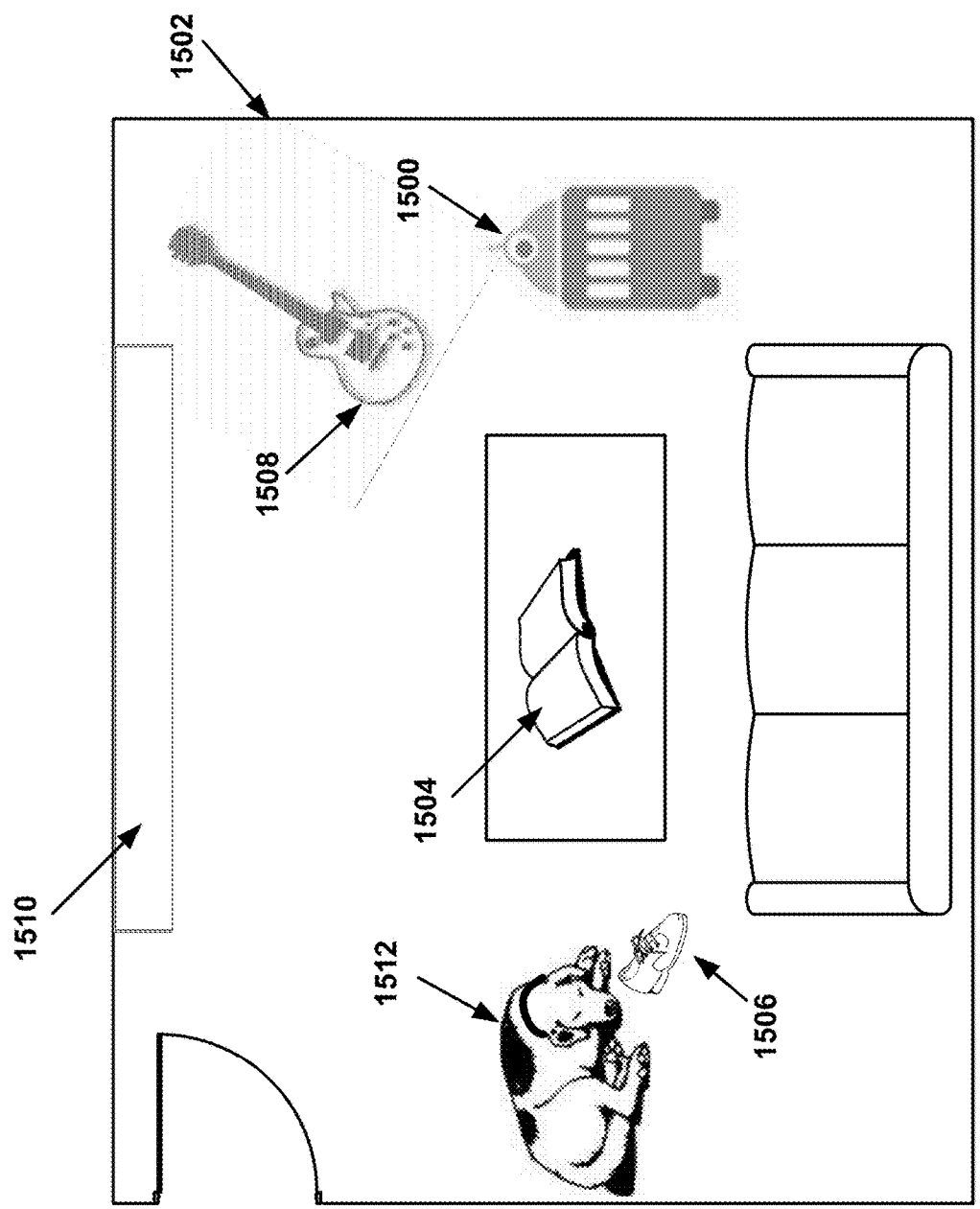
FIG. 15 is an example conceptual illustration of a robot interacting with an object.

FIG. 15 is an example conceptual illustration of a robot interacting with an object, in accordance with at least some embodiments described below. In particular, FIG. 15 includes a robot 1500 located in an area, such as a living room 1502. Also located in the living room 1502 may be a number of objects including a book 1504, a shoe 1506, a guitar 1508, and a bookcase 1510. A dog 1512, or other animal, may also be located in the living room 1502. As described above, the robot 1500 may examine one or more of the objects to (i) read information from a code, tag, beacon, etc. associated with the object and (ii) determine a current location of the object. The robot 1500 may additionally or alternatively obtain images of objects in the living room 1502 as described elsewhere herein. In the case of the dog 1512, the robot may scan an RFID tag located in the dog's 1512 collar, for example. The robot 1500 may send identification data associated with the objects (e.g., images of the objects and/or information read from codes, tags, beacons, etc. associated with the objects) and the current locations of the objects to the server.

In some embodiments, more than one robot may identify objects within the living room 1502. For example, the robot 1500 may scan the living room 1502, or a portion thereof, concurrently with or at a different time as another robot. Each robot may send the identification data and current location data to the server, where the identification data and location data associated with the objects may be added to the database. In the event of conflicting data, such as different current location data for the same object, the server may apply a conflict resolution algorithm or the like to resolve the conflicting data. The current location of the object may be associated with a first map.

The server may compare the first map having the current location of the objects in the living room 1502 to a second map. The second map may be a map having a preferred location for each of the objects in the living room 1502. The preferred location may be entered by the user and may indicate the location that the user would like the object to be positioned. Optionally, in some embodiments, the server may determine the preferred location by identifying the location where the object is most frequently located and noting that location as the preferred location. The server may make this determination using database lookups, for example.

In one example, the server may determine that the book 1504 is frequently located on the coffee table, instead of in the bookcase 1510. From this information, the server may determine that the preferred location of the book 1504 is on the coffee table. Similarly, the server may determine that the user has entered a preferred location for the shoe 1506 and the guitar 1508. The server may not have a preferred location for the dog 1512, because the dog's 1512 location may be sporadic. Rather, the server may represent the dog's 1512 location in the map as present or not present. A map having one or more of the preferred locations may be used as the second map.

The server may identify differences between the first map and the second map. Thus, the server may identify the shoe 1506 as belonging in a bedroom closet located in a different map associated with the bedroom closet. The server may also identify the guitar 1508 as belonging hung up on a wall in the living room 1502. In some embodiments, the server may also identify similarities between the first map and the second map, such as the location of the book 1504 on the coffee table.

The server may perform an inventory of the objects in the living room 1502. The server may send the inventory, the first map, and/or the second map to the robot 1500 or another entity. An example entity may include an insurance company. For example, if a break-in were to occur at a house, the owner of the house may file an insurance claim for any stolen items. The owner may also grant the insurance company access to an inventory of objects that were located in the house at the time of the break-in. The insurance company may compare the insurance claim against the inventory of one or more maps of the house. Using this inventory, the insurance company may determine whether to accept or reject the insurance claim.

In another example, the entity may be a fire department. The fire department may receive a call indicating that the house is on fire. The fire department may obtain an inventory of one or more maps associated with the house. The fire department may use the information to determine a floor plan of the house as well as the location of objects in the house. This may allow the fire department to safely enter the house and to maneuver around objects, such as a couch or a coffee table. The fire department may also use the information from the inventory of one or more of the maps to determine if any animals, such as the dog 1512, are inside of the house.

6. Conclusion

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Since many modifications, variations, and changes in detail can be made to the described example, it is intended that all matters in the preceding description and shown in the accompanying figures be interpreted as illustrative and not in a limiting sense.

What is claimed is:

1. A method comprising:
   receiving, at a computing system, a first request from a user device to establish a current state of an area as a default configuration for the area;
   in response to the first request, transmitting, by the computing system to a first robotic device, instructions to obtain a first set of sensor data representative of the area, wherein the first robotic device is navigating the area;
   responsive to receiving the first set of sensor data representative of the area, determining, by the computing system, a first map that represents the area in the default configuration, wherein the default configuration indicates respective positions of objects in the area when the first robotic device obtained the first set of sensor data;
   receiving, at the computing system, a second request from the user device to restore a state of the area to the default configuration;
   in response to the second request, transmitting, by the computing system to a second robotic device, instructions to obtain a second set of sensor data representative of the area;
   responsive to receiving the second set of sensor data representative of the area, determining, by the computing system, a second map that represents the area in a second configuration, wherein the second configuration indicates respective positions of objects in the area when the second robotic device obtained the second set of sensor data;
   performing, by the computing system, a comparison between the first map and the second map;
   based on the comparison, identifying, by the computing system, a change in position of an object in the area in the second configuration relative to the default configuration; and
   transmitting, by the computing system, instructions to the second robotic device to adjust a position of the object according to the default configuration.

2. The method of claim 1, wherein the first set of sensor data includes sensor data from one or more sensors, wherein the one or more sensors includes at least a camera system.

3. The method of claim 1, further comprising:
   determining a timestamp corresponding to the first set of sensor data received from the first robotic device, wherein the timestamp indicates when the computing system received the first set of sensor data from the first robotic device; and
   wherein determining, by the computing system of the robotic device, the first map that represents the area in the default configuration comprises:
   associating the first map that represents the area in the default configuration with the timestamp corresponding to the sensor data.

4. The method of claim 1, wherein determining the first map that represents the area in the default configuration further comprises:
   determining an inventory of the area in the default configuration, wherein the inventory indicates at least a quantity of respective objects in the area in the default configuration.

5. The method of claim 4, wherein the inventory of the area in the default configuration further comprises information indicative of positions, dimensions, textures, and colors of the respective objects in the area in the default configuration.

6. The method of claim 5, wherein transmitting instructions to the second robotic device to adjust the position of the object according to the default configuration is based at least on part on the information of the inventory indicative of positions, dimensions, textures, and colors of the respective objects in the area in the default configuration.

7. The method of claim 4, wherein identifying a change in position of an object in the area in the second configuration relative to the default configuration comprises:
   determining a given object is missing in the area in the second configuration based on the comparison and the inventory of the area in the default configuration.

8. A system comprising:
   one or more processors; and
   a non-transitory computer-readable medium, configured to store instructions, that when executed by the one or more processors, cause the system to perform functions comprising:
      receiving a first request from a user device to establish a current state of an area as a default configuration for the area;
      in response to the first request, transmitting, to a first robotic device, instructions to obtain a first set of sensor data representative of the area, wherein the first robotic device is navigating the area;
      responsive to receiving the first set of sensor data representative of the area, determining a first map that represents the area in the default configuration, wherein the default configuration indicates respective positions of objects in the area when the first robotic device obtained the first set of sensor data;
      receiving a second request from the user device to restore a state of the area to the default configuration;
      in response to the second request, transmitting, to a second robotic device, instructions to obtain a second set of sensor data representative of the area;
      responsive to receiving the second set of sensor data representative of the area, determining a second map that represents the area in a second configuration, wherein the second configuration indicates respective positions of objects in the area when the second robotic device obtained the second set of sensor data;
      performing a comparison between the first map and the second map;
      based on the comparison, identifying a change in position of an objects in the area in the second configuration relative to the default configuration; and
      transmitting instructions to the second robotic device to adjust a position of the object according to the default configuration.

9. The system of claim 8, wherein determining the second map that represents the area in the second configuration comprises:
   determining an inventory of the area in the second configuration, wherein the inventory indicates at least a quantity of respective objects in the area in the second configuration.

10. The system of claim 9, wherein the inventory of the area in the second configuration further comprises information indicative of positions, dimensions, textures, and colors of the respective objects in the area in the second configuration.

11. The system of claim 10, wherein performing the comparison between the first map and the second map further comprises:
   performing a second comparison between the inventory of the area in the second configuration and the inventory of the area in the default configuration.

12. The system of claim 11, wherein identifying the change in position of the objects in the area in the second configuration relative to the default configuration is further based on the second comparison.

13. A non-transitory computer readable medium having stored thereon instructions executable by a computing device to cause the computing device to perform functions comprising:
   receiving a first request from a user device to establish a current state of an area as a default configuration for the area;
   in response to the first request, transmitting, to a first robotic device, instructions to obtain a first set of sensor data representative of the area, wherein the first robotic device is navigating the area;
   responsive to receiving the first set of sensor data representative of the area, determining a first map that represents the area in the default configuration, wherein the default configuration indicates respective positions of objects in the area when the first robotic device obtained the first set of sensor data;
   receiving, at a computing system, a second request from the user device to restore a state of the area to the default configuration;
   in response to the second request, transmitting, to a second robotic device, instructions to obtain a second set of sensor data representative of the area;
   responsive to receiving the second set of sensor data representative of the area, determining a second map that represents the area in a second configuration, wherein the second configuration indicates respective positions of objects in the area when the second robotic device obtained the second set of sensor data;
   performing a comparison between the first map and the second map;
   based on the comparison, identifying a change in position of an object in the area in the second configuration relative to the default configuration; and
   transmitting instructions to the second robotic device to adjust a position of the object according to the default configuration.

14. The non-transitory computer readable medium of claim 13, further comprising:
   receiving a request to set the second map that represents the area in the second configuration as a new default configuration of the area; and
   responsive to receiving the request, setting the second map that represents the area in the second configuration as the new default configuration of the area.

15. The non-transitory computer readable medium of claim 13, wherein determining the first map that represents the area in the default configuration further comprises:
   determining an inventory of the area in the default configuration, wherein the inventory indicates at least a quantity of respective objects in the area in the default configuration.

16. The non-transitory computer readable medium of claim 15, wherein determining the second map that represents the area in the second configuration further comprises:
   modifying the inventory of the area in the default configuration based on respective objects in the second map of the area in the second configuration.

* * * * *